United States Patent
Matsumiya et al.

(10) Patent No.: US 10,525,356 B2
(45) Date of Patent: Jan. 7, 2020

(54) STORAGE MEDIUM, GAME APPARATUS, GAME SYSTEM AND GAME CONTROL METHOD

(71) Applicant: NINTENDO CO., LTD., Kyoto (JP)

(72) Inventors: Nobuo Matsumiya, Kyoto (JP); Emi Makiuchi, Kyoto (JP); Masahiro Yamamoto, Tokyo (JP); Keita Sakunaga, Tokyo (JP); Takeshi Kawamorita, Tokyo (JP); Yosuke Suda, Tokyo (JP)

(73) Assignee: NINTENDO CO., LTD., Kyoto (JP)

( * ) Notice: Subject to any disclaimer, the term of this patent is extended or adjusted under 35 U.S.C. 154(b) by 0 days.

(21) Appl. No.: 15/962,166

(22) Filed: Apr. 25, 2018

(65) Prior Publication Data
US 2018/0345148 A1 Dec. 6, 2018

(30) Foreign Application Priority Data

Jun. 5, 2017 (JP) ................................ 2017-110830
Dec. 1, 2017 (JP) ................................ 2017-231371

(51) Int. Cl.
| | |
|---|---|
| A63F 9/24 | (2006.01) |
| A63F 13/00 | (2014.01) |
| G06F 17/00 | (2019.01) |
| G06F 19/00 | (2018.01) |
| A63F 13/577 | (2014.01) |
| A63F 13/837 | (2014.01) |
| A63F 13/5372 | (2014.01) |
| A63F 13/573 | (2014.01) |
| A63F 13/5258 | (2014.01) |

(52) U.S. Cl.
CPC ........ *A63F 13/577* (2014.09); *A63F 13/5372* (2014.09); *A63F 13/573* (2014.09); *A63F 13/837* (2014.09); *A63F 13/5258* (2014.09); *A63F 2300/643* (2013.01); *A63F 2300/6646* (2013.01)

(58) Field of Classification Search
USPC ........................ 463/1, 20, 22, 25, 30, 31, 36
See application file for complete search history.

(56) References Cited

U.S. PATENT DOCUMENTS

2013/0023341 A1* 1/2013 Yamanouchi ......... G06F 3/0304
463/31

FOREIGN PATENT DOCUMENTS

WO 2011/122214 10/2011

\* cited by examiner

*Primary Examiner* — Adetokunbo O Torimiro
(74) *Attorney, Agent, or Firm* — Nixon & Vanderhye PC

(57) ABSTRACT

A non-limiting example game apparatus includes a display device, and a game screen is displayed on the display device. For example, a player character, an enemy character, a background object, etc. are displayed in the game screen. If a throw mode is set, a target cursor is moved on a predetermined plane in a virtual space based on an operation of a player, thereby to designate a target object with which a throwing object is made to be collided. When the target object is designated, a route object is displayed on a line segment that connects a throw starting point and a target point that is the designated position on the target object, and a shadow of the route object is displayed.

22 Claims, 12 Drawing Sheets

FIG. 3  GAME SCREEN (NORMAL MODE)
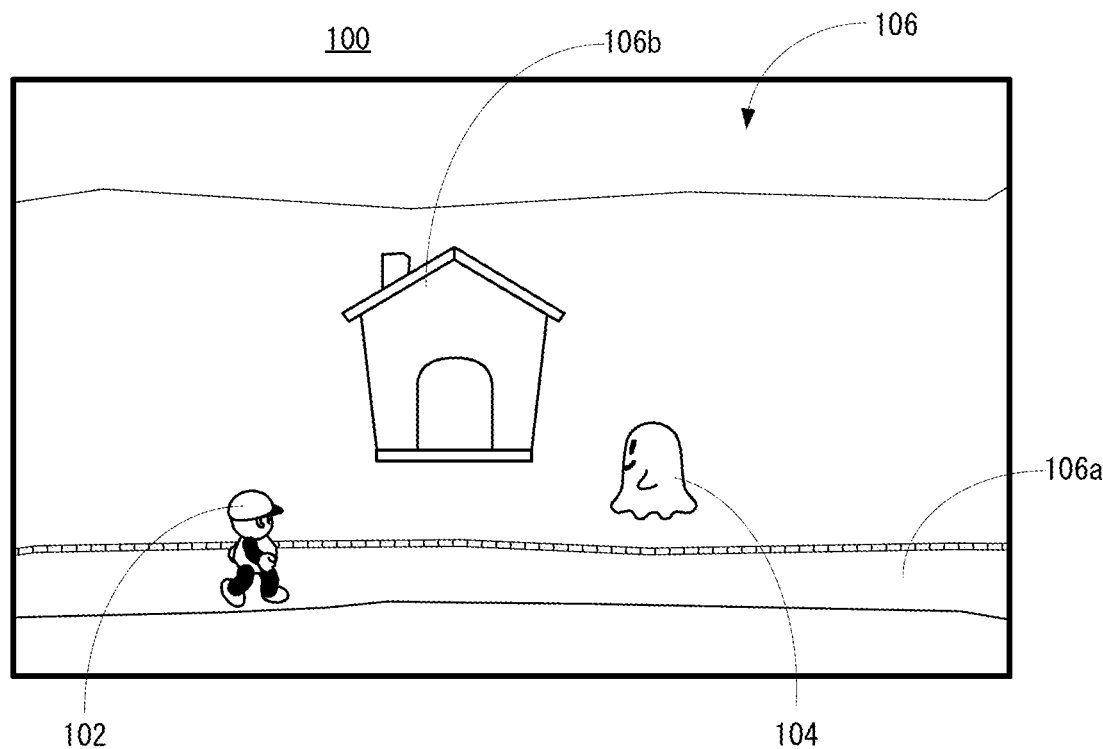
FIG. 4  GAME SCREEN (THROW MODE)
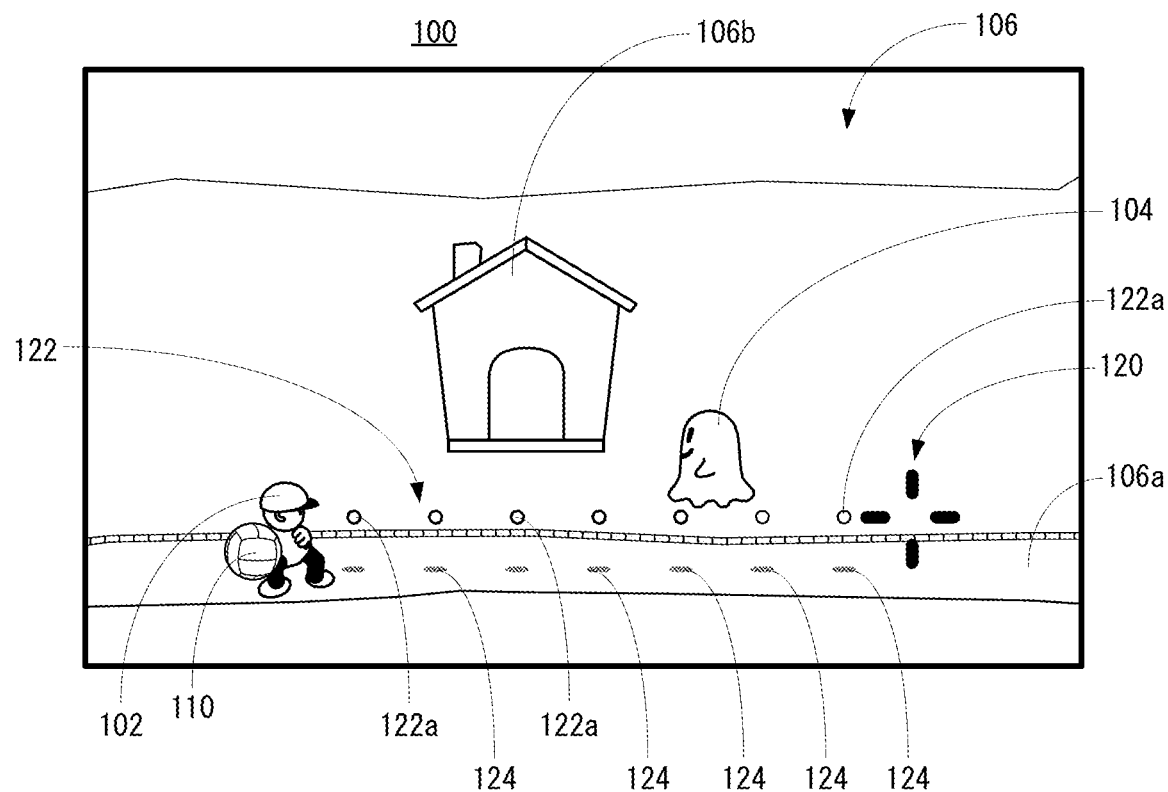

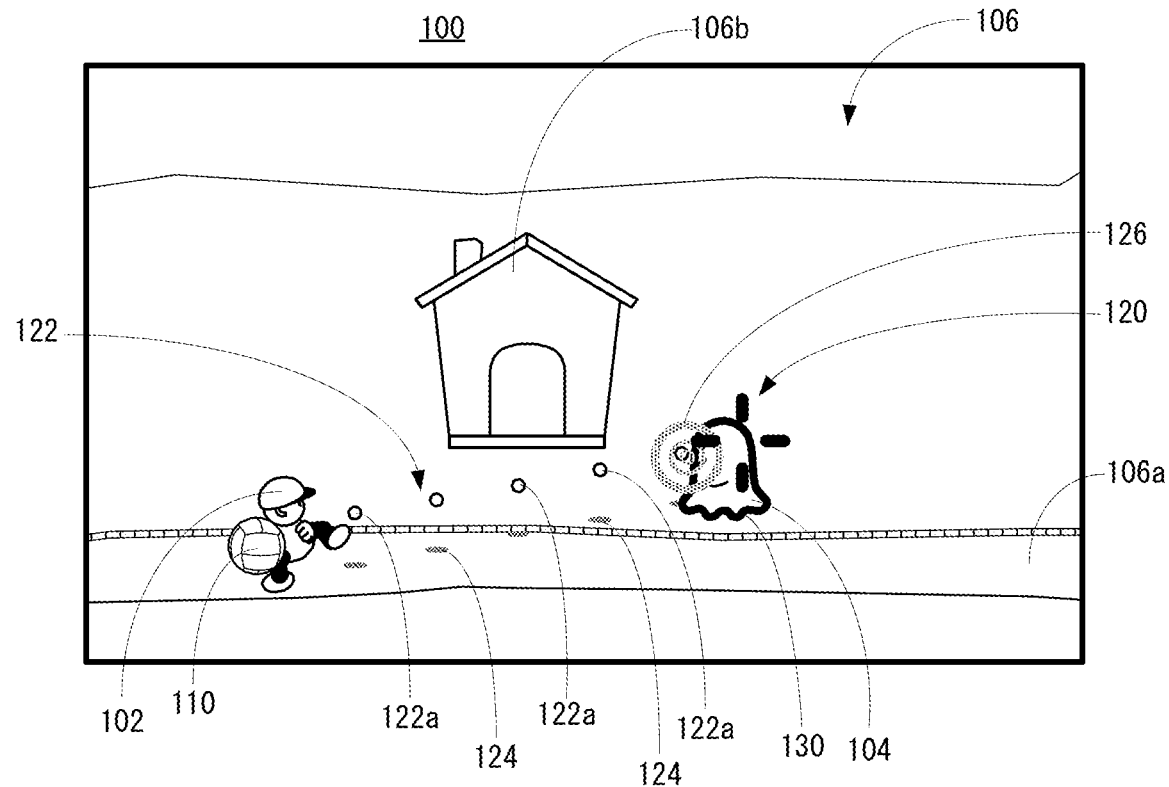
FIG. 6 GAME SCREEN (THROW MODE)
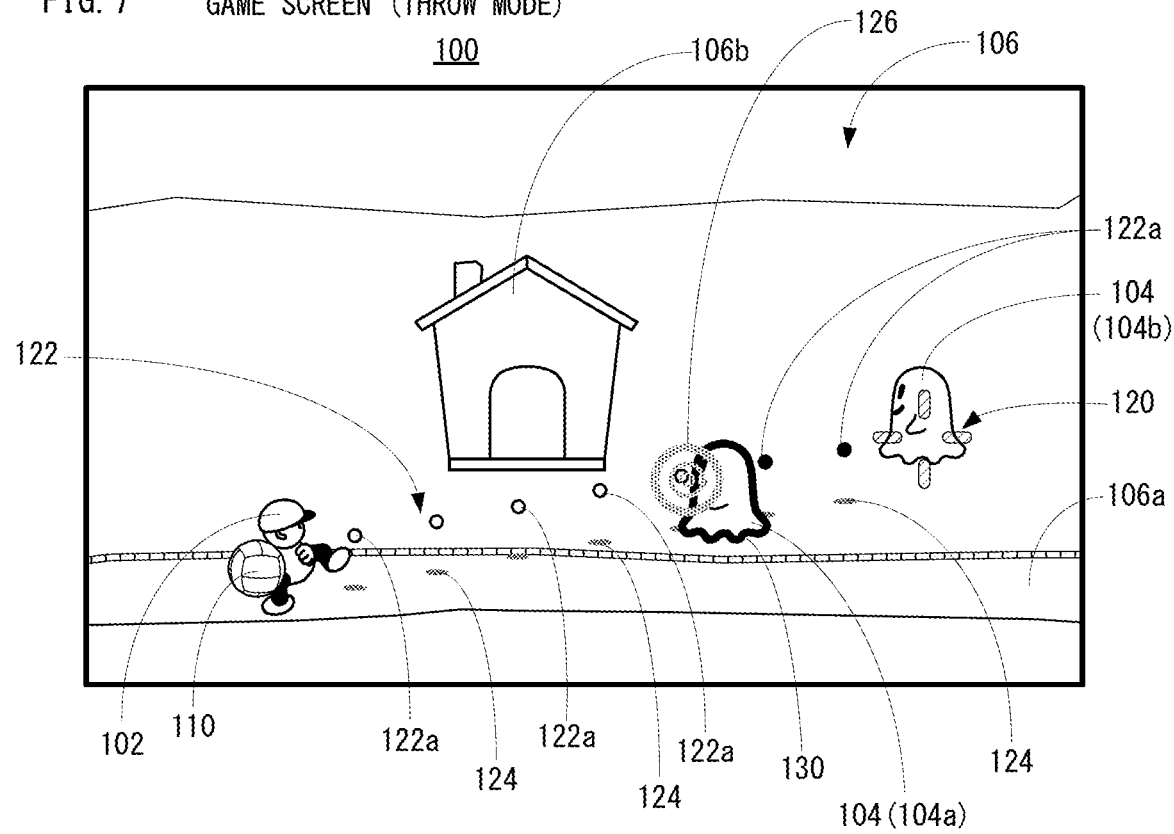
FIG. 7 GAME SCREEN (THROW MODE)

FIG. 8 GAME SCREEN (THROW MODE)
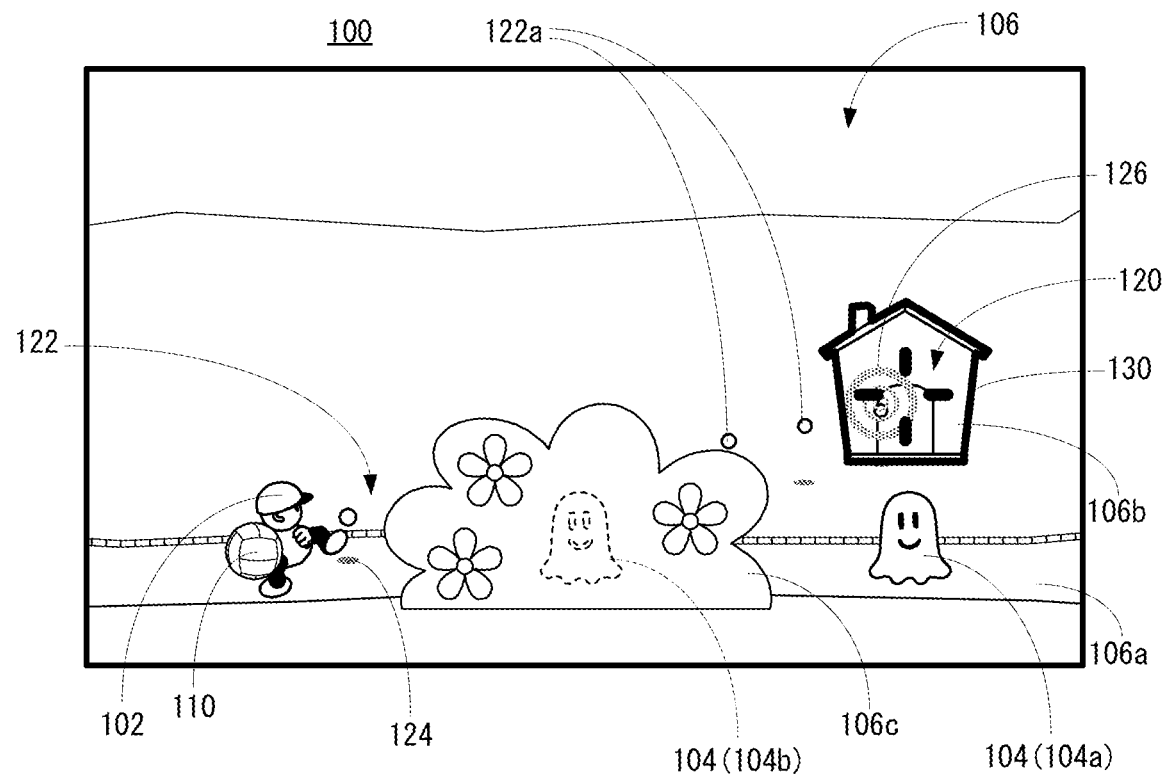
FIG. 9 GAME SCREEN (THROW MODE)
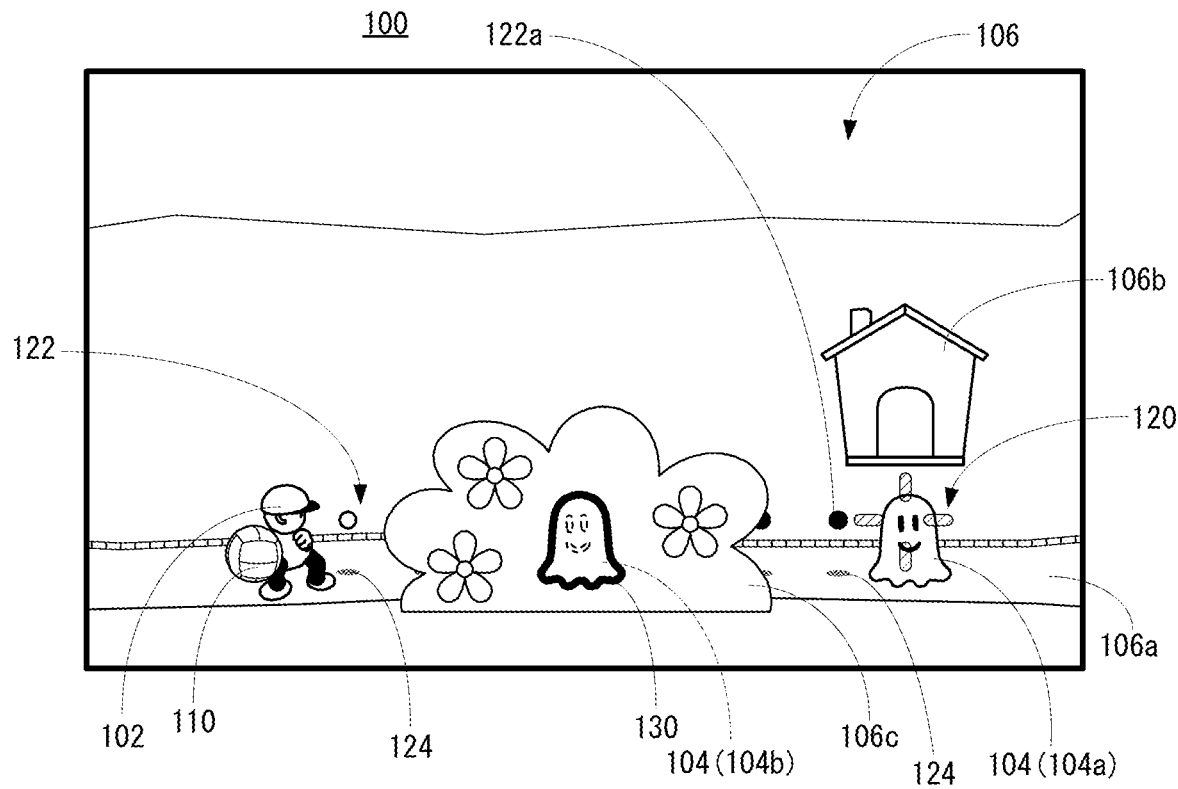

FIG. 10  GAME SCREEN (THROW MODE)
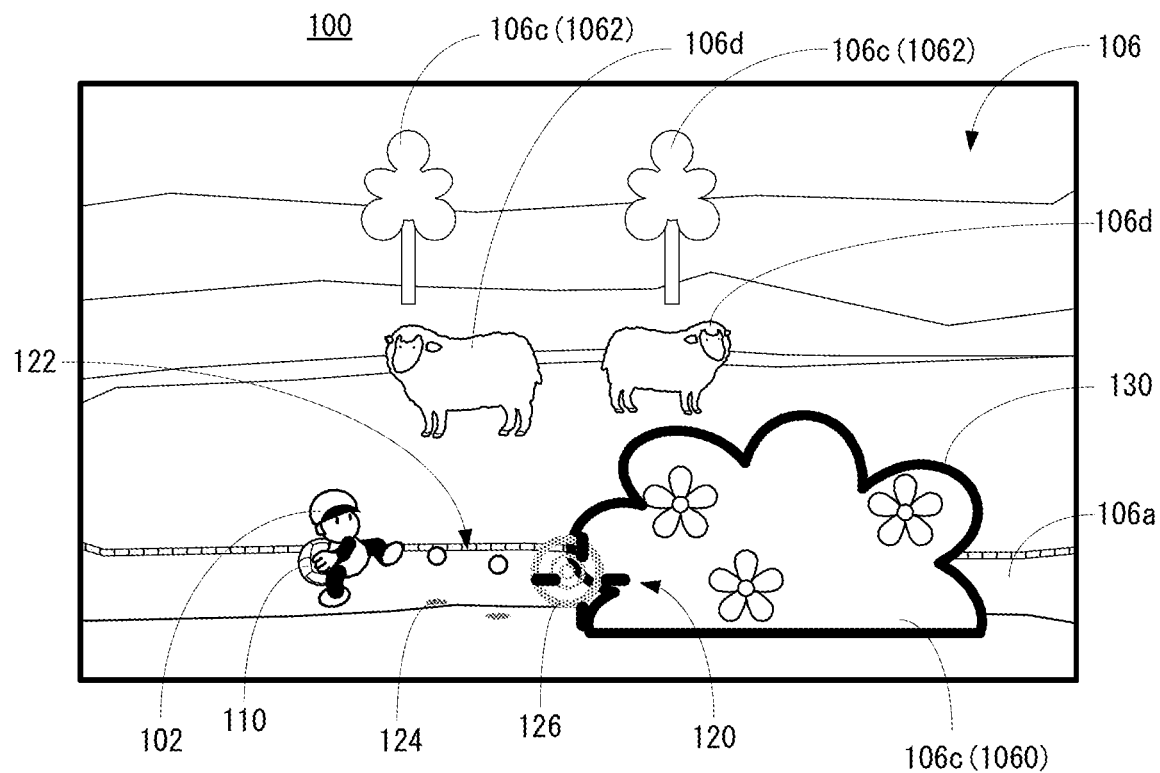

FIG. 12

DATA STORAGE AREA 304

| |
|---|
| OPERATION DATA BUFFER |
| IMAGE GENERATION DATA |
| PLAYER CHARACTER DATA |
| POSSESSION ITEM DATA |
| TARGET CURSOR POSITION DATA |
| NON-TARGET DATA |
| STARTING POINT DATA |
| TARGET POINT DATA |
| TARGET OBJECT DATA |
| ROUTE OBJECT DATA |
| SHADOW POSITION DATA |
| COLLISION PREDICTION POINT DATA |
| COLLISION PREDICTION OBJECT DATA |
| COLLISION OBJECT DATA |
| THROW FLAG |
| ⋮ |

304a
304b
304c
304d
304e
304f
304g
304h
304i
304j
304k
304m
304n
304p
304q

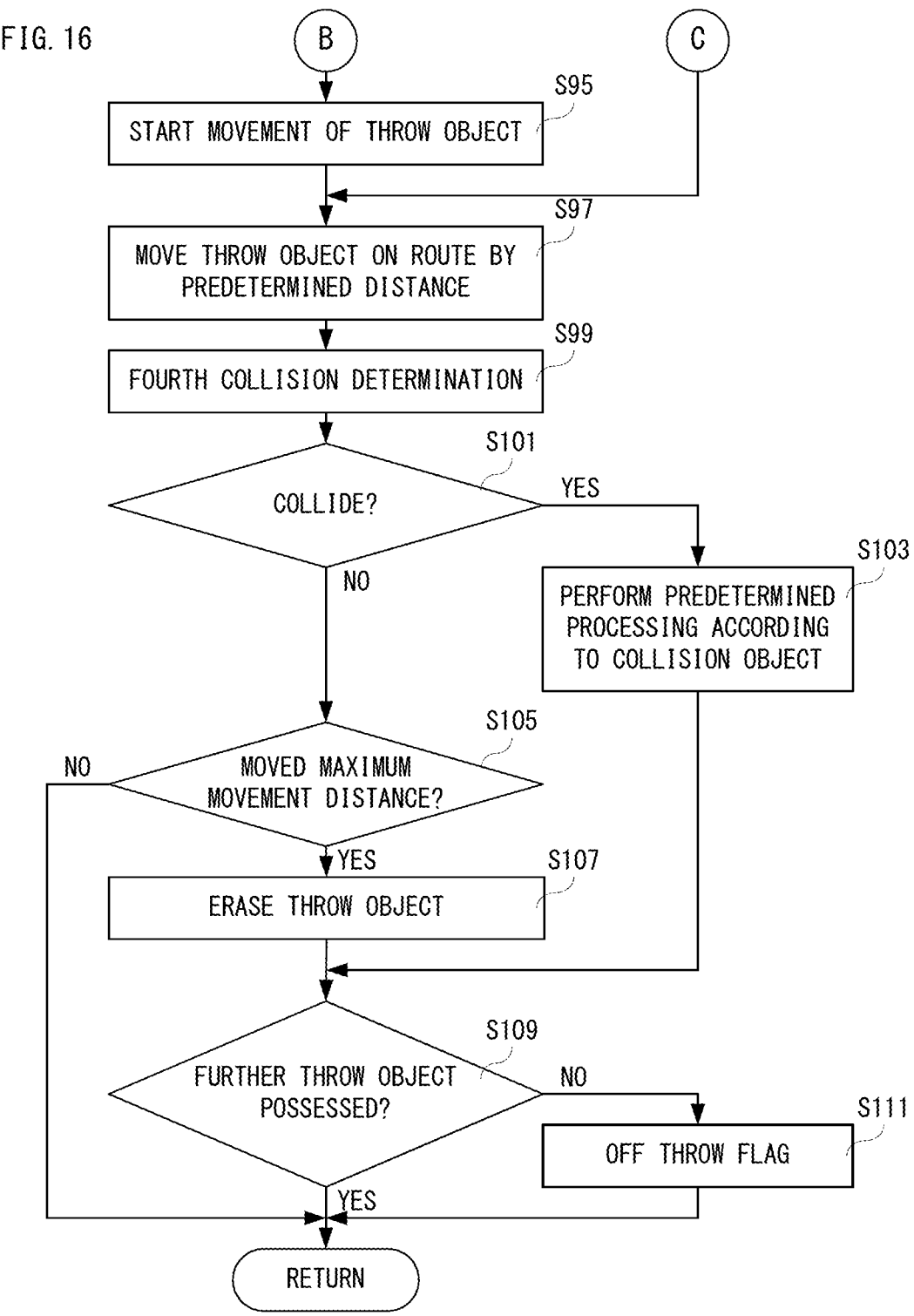

STORAGE MEDIUM, GAME APPARATUS, GAME SYSTEM AND GAME CONTROL METHOD

CROSS REFERENCE OF RELATED APPLICATION

The disclosures of Japanese patent applications No. 2017-110830 filed on Jun. 5, 2017 and No. 2017-231371 filed on Dec. 1, 2017 are incorporated by reference.

FIELD

This application describes a storage medium, a game apparatus, a game system and a game control method, moving a predetermined object from a movement starting position to a designated position in a virtual space based on an operation of a player.

SUMMARY

It is a primary object of an embodiment(s) to provide a novel storage medium, game apparatus, game system and game control method.

Moreover, it is another object of the embodiment(s) to provide a storage medium, game apparatus, game system and a game control method, capable of knowing a target object easily.

A first embodiment is a non-transitory computer readable storage medium storing a game program executable by a computer of an information processing apparatus, wherein the game program causes one or more processors of the computer to perform steps of: a cursor control step; a designated position calculation step; a route object placement step; and an image generation step. The cursor control step is configured to move a cursor object on a predetermined plane based on an operation of a player, and arrange the cursor object so as to be displayed on a front of another object in a virtual space. The designated position calculation step is configured to calculate a position in the virtual space corresponding to a display position of the cursor object, and render the position as a designated position in the virtual space. The route object placement step is configured to place in the virtual space a route object that indicates a route from a predetermined starting point position to the designated position in the virtual space. The image generation step is configured to generate an image of the virtual space.

According to the first embodiment, since the route object indicating the route from the starting point position to the designated position is placed, it is possible to know the designated position easily.

A second embodiment is the storage medium according to the first embodiment, wherein the image generation step is configured to generate an image to be a shadow of the route object in the virtual space.

According to the second embodiment, since the image to be a shadow of the route object is generated, it is possible to know the designated position more easily.

A third embodiment is the storage medium according to the first embodiment, wherein the game program further causes the one or more processors to perform a shadow placement step configured to place an object that indicates the shadow of the route object in the virtual space.

According to the third embodiment, when arranging a shadow object, it is possible to know the designated position more easily, like the second embodiment.

A fourth embodiment is the storage medium according to the first embodiment, wherein the game program further causes the one or more processors to perform a player character arrangement step configured to arrange a player character in the virtual space so as to face the designated position.

According to the fourth embodiment, since the player character is faced to the designated position, it is possible to know, according to a direction of the player character, the designated position as well as a direction of the designated position.

A fifth embodiment is the storage medium according to the fourth embodiment, wherein the starting point position is a position having a predetermined positional relationship with a position that the player character is arranged. However, the starting point position may be the position that the player character is arranged, or may be sufficient a position having a predetermined positional relationship with the position that the player character is arranged.

A sixth embodiment is the storage medium according to the fourth embodiment, wherein the game program further causes the one or more processors to perform a mode switching step configured to switch between a cursor operating mode that the cursor object is to be moved and a player character moving mode that the player character is to be moved based on an operation of the player.

A seventh embodiment is the storage medium according to the first embodiment, wherein the game program further causes the one or more processors to perform a discharge step configured to discharge a predetermined discharge target object along the route from the starting point position toward the designated position based on an operation of the player; and a collision processing step configured to perform, when the discharge target object collides with a predetermined object in the virtual space after the discharge target object is discharged, predetermined processing according to the predetermined object.

According to the seventh embodiment, since the predetermined processing is performed in response to collision of the discharge target object with the predetermined object, it is possible to cause the player to perform processing according to a predetermined object aimed at by the player.

An eighth embodiment is the storage medium according to the seventh embodiment, wherein the game program further causes the one or more processors to perform a target object determination step configured to determine, before the discharge target object is discharged, whether an object to be a target to be processed in the collision processing step is arranged at the designated position; and a designated position determination step configured to change, when it is determined that the object to be a target is arranged at the designated position in the target object determination step, a display manner of the object to be a target.

According to the eighth embodiment, before the discharge target object is discharged, it is possible to know whether the object to be a target is arranged at the designated position by change of the display manner. Therefore, it is possible to easily know whether the designated position is designating (specifying) the object to be a target.

A ninth embodiment is the storage medium according to the seventh embodiment, wherein the game program further causes the one or more processors to perform a further object determination step configured to determine whether a further object exists in a middle to the designated position on the route; and a first display manner step configured to change a display manner of the cursor object according to a determination result in the further object determination step.

According to the ninth embodiment, since the display manner of the cursor object is changed according to whether a further object exists in the middle to the designated position on the route, for example, it is possible to know whether the discharge target object collides with the further object before the discharge target object is moved to the designated position.

A tenth embodiment is the storage medium according to the ninth embodiment, wherein the game program further causes the one or more processors to perform a second display manner step configured to change, when it is determined that the further object exists in the further object determination step, a display manner of the route object from the starting point to the further object and a display manner of the route from the further object to the cursor object.

According to the tenth embodiment, since the display manner of the route object from the starting point to the further object and the display manner of the route from the further object to the cursor object are changed when the further object exists in the middle to the designated position, it is possible to know whether the discharge target object collides with the further object before the discharge target object is moved to the designated position also by the display manner of the route object.

An eleventh embodiment is a game apparatus, comprising: a cursor control portion configured to move a cursor object on a predetermined plane based on an operation of a player, and arrange the cursor object so as to be displayed in a front of another object in a virtual space; a designated position calculation portion configured to calculate a position in the virtual space corresponding to a display position of the cursor object, and render the position as a designated position in the virtual space; a player character arrangement portion configured to arrange a player character in the virtual space so as to face the designated position; a route object placement portion configured to place in the virtual space a route object that indicates a route from a predetermined starting point position that is a position having a predetermined positional relationship with a position that the player character is arranged to the designated position in the virtual space; and an image generation portion configured to generate an image of the virtual space, wherein the image generation portion is configured to generate an image to be a shadow of the route object in the virtual space.

According to the eleventh embodiment, since the route object indicative of the route from the starting point position to the designated position is placed and the image to be a shadow of the route object is generated, it is possible to know the designated position easily.

A twelfth embodiment is a game system, comprising: a cursor control portion configured to move a cursor object on a predetermined plane based on an operation of a player, and arrange the cursor object so as to be displayed in a front of another object in a virtual space; a designated position calculation portion configured to calculate a position in the virtual space corresponding to a display position of the cursor object, and render the position as a designated position in the virtual space; a route object placement portion configured to place in the virtual space a route object that indicates a route from a predetermined starting point position to the designated position in the virtual space; and an image generation portion configured to generate an image of the virtual space.

A thirteenth embodiment is a game control method performed by a computer of an information processing apparatus, wherein the computer performs steps of: (a) moving a cursor object on a predetermined plane based on an operation of a player so that the cursor object is arranged so as to be displayed in a front of another object in a virtual space; (b) calculating a position in the virtual space corresponding to a display position of the cursor object so as to render the position as a designated position in the virtual space; (c) placing in the virtual space a route object that indicates a route from a predetermined starting point position to the designated position in the virtual space; and (d) generating an image of the virtual space.

According to each of the twelfth and thirteenth embodiments, it is possible to easily know the designated position like the first embodiment.

The above described objects and other objects, features, aspects and advantages of the embodiment(s) will become more apparent from the following detailed description when taken in conjunction with the accompanying drawings.

BRIEF DESCRIPTION OF THE DRAWINGS

FIG. 3 is an illustration view showing a non-limiting example first game screen displayed on a display shown in FIG. 1.

FIG. 4 is an illustration view showing a non-limiting example second game screen displayed on the display shown in FIG. 1.

FIG. 6 is an illustration view showing a non-limiting example third game screen displayed on the display shown in FIG. 1.

FIG. 7 is an illustration view showing a non-limiting example fourth game screen displayed on the display shown in FIG. 1.

FIG. 8 is an illustration view showing a non-limiting example fifth game screen displayed on the display shown in FIG. 1.

FIG. 9 is an illustration view showing a non-limiting example sixth game screen displayed on the display shown in FIG. 1.

FIG. 10 is an illustration view showing a non-limiting example seventh game screen displayed on the display shown in FIG. 1.

FIG. 12 is an illustration view showing non-limiting example specific contents of a data storage area shown in FIG. 11.

FIG. 16 is a flowchart showing a still another part of the throw processing of a processor shown in FIG. 2, following FIG. 14.

DETAILED DESCRIPTION OF NON-LIMITING EXAMPLE EMBODIMENTS

Figure 1:
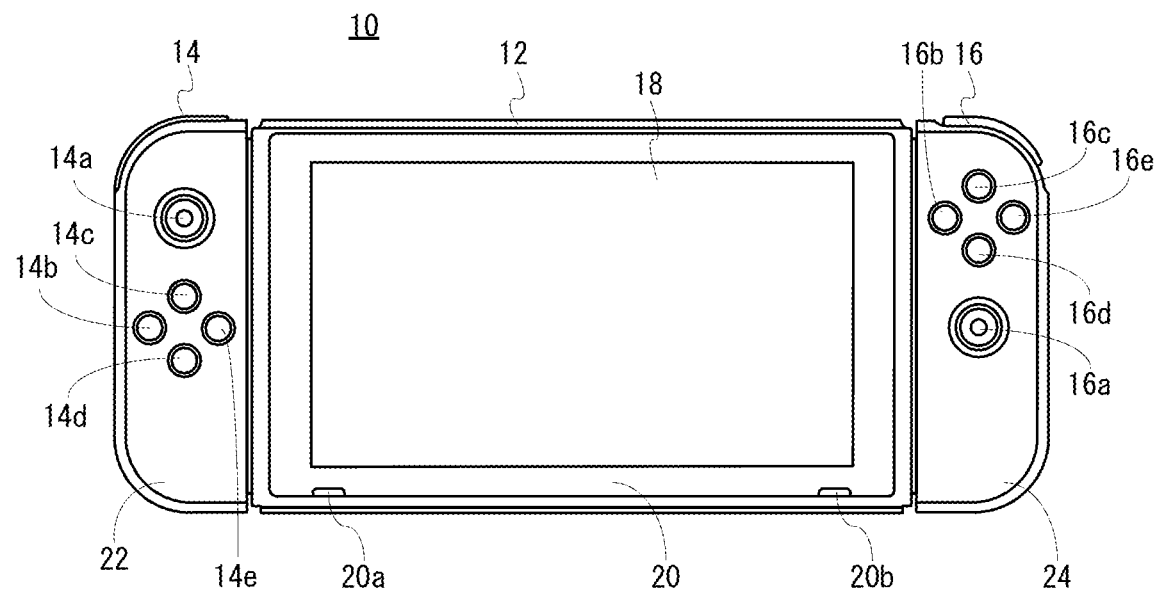
FIG. 1 is an illustration view showing a non-limiting example an appearance configuration of a non-limiting example game apparatus.

FIG. 1 is an illustration view showing a non-limiting example appearance configuration of a non-limiting example game apparatus 10 of this embodiment. An example of the game apparatus 10 in this embodiment includes a main body apparatus (information processing apparatus; in this embodiment, functioning as a game apparatus main body) 12, a left controller 14 and a right controller 16. In this embodiment, the game apparatus 10 can be used as an apparatus that is integrally provided with the left controller 14 and the right controller 16 (hand-held type apparatus, portable type apparatus, mobile apparatus).

However, the game apparatus 10 is not needed to be limited to a game dedicated machine, may be a general purpose PC (various types of PCs, such as a desktop PC, a notebook PC, a tablet PC, etc.), a mobile telephone or a smartphone each having a game function. Moreover, as the game apparatus 10, a portable type game apparatus, a stationary type game apparatus, or a game apparatus that a portable type and a stationary type can be switched can be used, and an arcade game machine can be also used. When using the game apparatus 10 as a stationary type game apparatus, since a monitor such as a television receiver and controller(s) (14 and/or 16) are connected to the main body apparatus 12, in this case, a game system comprising the game apparatus 10 and the monitor is constituted. Moreover, when the game apparatus 10 is connected communicably to a further game apparatus or computer so that game processing or the like is performed in cooperation with a processor incorporated in the further game apparatus or computer, a network system (another game system) comprising the game apparatus 10 and the further game apparatus or computer that are connected with the game apparatus 10 communicably.

Moreover, it may be constituted that the left controller 14 and the right controller 16 are attachable to or detachable from the main body apparatus 12, respectively. In such a case, the game apparatus 10 may be constituted that the main body apparatus 12 is communicably connected to the left controller 14 and the right controller 16 so that the main body apparatus 12, the left controller 14 and the right controller 16 can be used as separate units.

In this embodiment, as shown in FIG. 1, the left controller 14 and the right controller 16 are provided integrally with the main body apparatus 12, respectively. The main body apparatus 12 is an apparatus that performs various kinds of processing (for example, game processing) in the game apparatus 10. The main body apparatus 12 comprises a display device 18. The left controller 14 and the right controller 16 are devices each comprising an operating portion for a user to perform an input.

The main body apparatus 12 comprises a substantially plate-like housing 20. In this embodiment, a main surface (in other word, a top surface, i.e., a surface provided with the display 18) of the housing 20 is roughly rectangular in shape.

The main body apparatus 12 comprises the display device 18 provided on the main surface of the housing 20. The display device 18 displays an image that is generated in the main body apparatus 12. In this embodiment, the display device 18 may be a liquid crystal display (LCD). However, the display device 18 may be an arbitrary type of display device.

Moreover, the main body apparatus 12 comprises a speaker (that is, speaker 44 shown in FIG. 2) in an interior of the housing 20. Speaker holes 20a and 20b are formed in the main surface of the housing 20. Then, an output sound of the speaker 44 is radiated from the speaker holes 20a and 20b, respectively.

The left controller 14 comprises an analog stick 14a, and the analog stick 14a is provided on the main surface of the housing 22 that is a substantially plate-like shape. The analog stick 14a can be used as a direction input portion capable of inputting directions. It is possible for a user, by tilting the analog stick 14a, to input a direction according to a tilting direction (and an input of a magnitude according to a tilting angle).

In addition, instead of the analog stick, the left controller 14 may be provided with a cross key, a slide stick capable of perform a slide input, or the like, as a direction input portion. Moreover, in this embodiment, it is possible to input depressing the analog stick 14a.

The left controller 14 comprises various types of operating buttons. The left controller 14 comprises four (4) operating buttons 14b, 14c, 14d and 14e (specifically a left direction button 14b, an upper direction button 14c, a down direction button 14d and a right direction button 14e) on the main surface of the housing 22. These operating buttons are used in order to perform instruction according to various kinds of programs (for example, an OS program and an application program) to be executed by the main body apparatus 12.

The right controller 16 comprises an analog stick 16a as a direction input portion like the left controller 14, and the analog stick 16a is provided on the main surface of the housing 22 that is a substantially plate-like shape. In this embodiment, the analog stick 16a is the same structure as that of the analog stick 14a of the left controller 14. Moreover, instead of the analog stick, the right controller 16 may be provided with a cross key, a slide stick capable of perform a slide input, or the like.

Moreover, like the left controller 14, the right controller 16 comprises four (4) operating buttons 16b, 16c, 16d and 16e (specifically a Y button 16b, an X button 16c, a B button 16d and an A button 16e) on the main surface of the housing 22.

Figure 2:
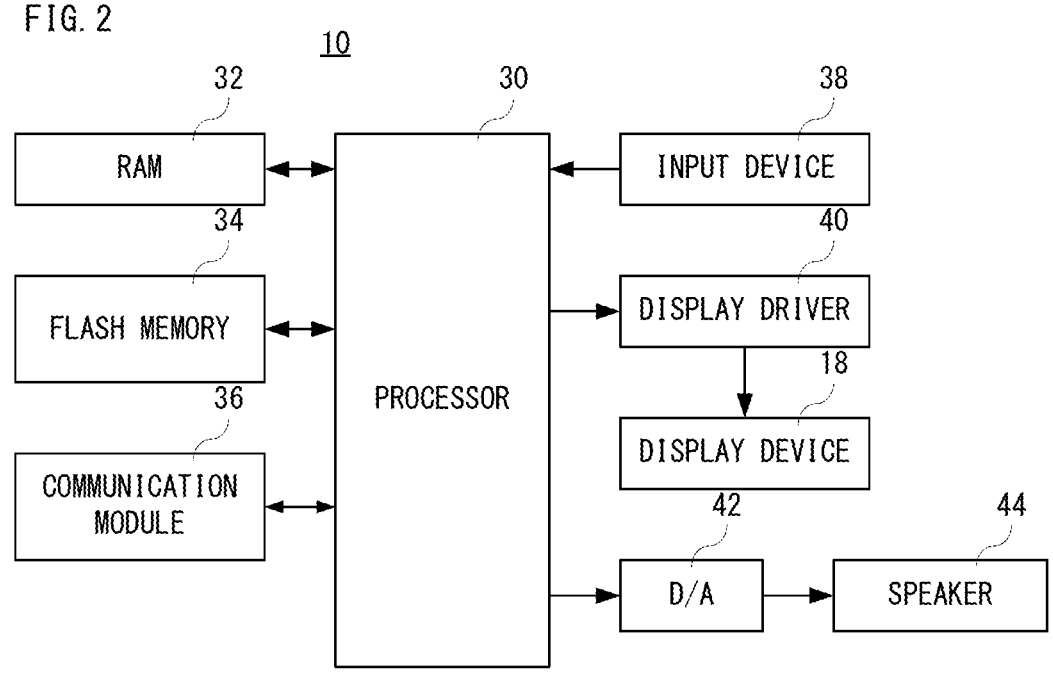
FIG. 2 is a block diagram showing non-limiting example electric structure of the game apparatus shown in FIG. 1.

FIG. 2 is a block diagram showing non-limiting example electric structure of the game apparatus 10 shown in FIG. 1. As shown in FIG. 2, the game apparatus 10 includes a processor 30, and the processor 30 is connected with a RAM 32, a flash memory 34, a communication module 36, an input device 38, a display driver 40 and a digital to analog (D/A) converter 42. Moreover, the game apparatus 10 includes the above-described display device 18 and the speaker 44. The processor 30 is connected to the display device 18 via the display driver 40. Moreover, the processor 30 is connected to the speaker 44 via the D/A converter 42.

The processor 30 is in charge of overall control of the game apparatus 10. Specifically, the processor 30 is an SoC (System-on-a-Chip) incorporating functions of a CPU and a GPU. The RAM 32 is a volatile storage medium and used as a working memory and a buffer memory for the processor 30. The flash memory 34 is a nonvolatile storage medium, and used in order to store application programs such as a game, and store (save) various kinds of data. For example, an application program is read out from the flash memory 34 to be stored in the RAM 32.

In addition, an application program may be read out from an external memory, such as an SD card, a memory stick or an optical disk each being attachable to the game apparatus 10, to be stored in the RAM 32. Moreover, the game apparatus 10 may download an application program from an external computer that is communicably connected to the game apparatus 10, to be stored in the RAM 32. About these, any one method or two or more methods are adopted.

However, the application does not need to be limited to the game program, and it is possible to execute various kinds of applications, such as a document creation application, an email application, a drawing application, a character practice application, a language training application, a learning application, etc.

The communication module 36 has a function to access a wireless LAN by a system conforming to the standard of IEEE802.11.b/g, for example. Therefore, for example, the processor 30 transmits or receives data to or from other equipment (computers, other game apparatuses 10, etc.) via an access point and Internet (network) with using the communication module 36. However, it is also possible to transmit or receive data to or from other equipment directly with using the communication module 36.

However, the communication module 36 may have a function to perform short-distance wireless communication instead of the function to access the wireless LAN. In such a case, the communication module 36 has a function to transmit or receive an infrared signal to or from other equipment (other game apparatuses etc.) with a predetermined communication system (infrared system, for example), and a function to perform wireless communication with the same or similar type of game apparatus according to a predetermined communication protocol (multilink protocol, for example). Therefore, for example, the processor 30 can transmit or receive data to or from the same or similar type of other game apparatuses directly with using the communication module 36. However, instead of the short-distance wireless communication of an infrared system, short-distance wireless communication according to other wireless-communication standards such as Bluetooth (registered trademark) may be performed.

Moreover, it may be provided with a communication module having a function to access a wireless LAN and a communication module having a function to perform short-distance wireless communication.

The input device 38 includes the analog stick 14a and the operating buttons 14b-14e provided on the above-described left controller 14, and the analog stick 16a and the operating buttons 16b-16e provided on the right controller 16. The input device 38 is used for various kinds of operations or inputs, such as a menu selection, game operation, a movement and zooming of a virtual camera, etc. by the user or a player (hereinafter, simply called a "player"). However, as the input device 38, a pointing device such as a touch panel, an input means such as a microphone, a camera, etc. may be provided instead of the operating means provided on the left controller 14 and the right controller 16, or together with such the operating means. Moreover, a touch panel may be integrally formed with the display device 18. The display device 18 in this case is a touch panel integral type display device.

The display driver 40 is used in order to display various kinds of images or screens such as a game image or game screen, etc. on the display device 18 under instructions of the processor 30.

The D/A converter 42 converts sound data applied from the processor 30 into an analog sound signal to output to the speaker 44. However, the game sound means a sound required for the game, such as an imitation sound of a game character or object, sound effects and music (BGM).

In addition, the electric structure of the game apparatus 10 shown in FIG. 2 is a mere example, and it does not need to be limited to this. For example, the communication module 36 may be dispensed with.

FIG. 3 shows a non-limiting example game screen 100 to be displayed on the display device 18 in a normal mode of the game of this embodiment. For example, character objects such a as a player character 102 and an enemy character 104 as well as virtual objects (background objects) 106, such as a road object 106a, a floor or terrain object, a sky (including clouds) object, a building object 106b and a plants (including flowers) objects 106c are arranged (provided) in a three-dimensional virtual space (virtual game space). In this embodiment, the building object 106b and the plants object 106c are objects with little thickness of a depth direction.

Moreover, there may be arranged with an object imitating animals (animal object) 106d in the virtual game space. However, since the animal object 106d of this embodiment is an object of an ornament depicting a picture of an animal and does not move like a road, a floor, a terrain, a building and plants, it is treated as the background object 106. This animal object 106d is also an object with little thickness of the depth direction.

Furthermore, in the virtual game space, character objects other than the player character 102 and the enemy character 104 may be arranged. Furthermore, in the virtual game space, item objects, such as a coin object, a tool (weapon) object, a medicine object, a food object, a throwing object 110 (see FIG. 4 etc.) are also arranged. However, the item object may be hidden in a rear side of the background object 106, or may appear by striking or breaking the background object 106.

An image that such a virtual game space is imaged by a virtual camera 200 (view point) is displayed on the display device 18 as a game screen 100. Specifically, the character object(s) (102, 104, etc.), the item object(s) (110, etc.) and the background object 106 are arranged (modeled) in the virtual game space, and a three-dimensional image viewed from the virtual camera 200 (imaged image by the virtual camera 200) is subjected to coordinate transformation into viewpoint coordinates or camera coordinates so that a position of the virtual camera 200 may serve as an origin. The image having been subjected to the coordinate transformation is prospectively projected on a screen (projection screen or virtual screen) with centering on a viewpoint position (perspective projection transformation). The image that is projected on the projection screen is displayed on the display device 18 as the game screen 100.

In addition, in this specification, when there is no necessity of distinguishing the character objects (102, 104, etc.), the background objects 106 and the item objects (110, etc.) from each other, these may be simply referred to as an "object".

In FIG. 3, the player character 102 is at lower left of the game screen 100, and is displayed on the road object. Moreover, the enemy character 104 is displayed downward from the center of the game screen 100. That is, the enemy character 104 is displayed diagonally forward of the player character 102. Furthermore, the building object 106b imitating a house is arranged between the player character 102 and the enemy character 104 and on the depth side of the road object 106a. Although detailed description is omitted, the background objects 106 other than the road object 106a, the building object 106b, the plants object 106c and the animal object 106d are the terrain object and the sky object. This is also applied to other game screens 100.

In a normal mode, the player character 102 is moved in a course provided in the virtual game space based on an operation of the player, to aim at a predetermined goal set in the course. Since the game of this embodiment is a horizontally scrolling game, and an advancing direction of the player character 102 is basically a right direction. However, the player can move the player character 102 in a right or left direction, an up or down direction, or an oblique direction by operating the operating buttons 14b-14e. Therefore, the normal mode can also be referred to as a mode to move the player character 102.

In addition, when the player moves the player character 102 upward, the player character 102 is moved toward the rear (direction separating from the virtual camera 200) in the virtual game space. Moreover, when player moves the player character 102 downward, the player character 102 is moved toward the front (direction approaching the virtual camera 200) in the virtual game space.

Moreover, in the normal mode, the player can make the player character 102 jump by operating the operating button 16e. Accordingly, it is possible to make the player character 102 move above steps or jump over steps, holes or grooves. Moreover, it is also possible to make the player character 102 hit the background object 106 floating in the air. By this, a predetermined item may appear from the background object 106. Alternatively, a predetermined item may appear instead of the background object 106.

In addition, when the player character 102 is attacked by the enemy character 104, the player character 102 goes out of the course, or the player character 102 cannot reach the goal within time, the game is over.

Moreover, it is also possible to make the player character 102 throw the throwing object 110 based on an operation of the player. If the player operating the operating button 16c, a throw mode is set instead of the normal mode. When the throw mode is set, the throwing object 110 that the player character 102 possesses is displayed as shown in FIG. 4. In an example shown in FIG. 4, the player character 102 holds the throwing object 110 with a right hand.

In addition, in the throw mode, if the player operates the operating button 16c, the normal mode is set instead of the throw mode.

Moreover, as shown in FIG. 4, at the beginning of setting the throw mode, a target cursor 120 is displayed in a position that is separated from the player character 102 by a first predetermined distance in front of the advancing direction (right in this embodiment) of the player character 102. As described later, the target cursor 120 is displayed in a predetermined color (green color, for example) in different from a target object that is designated by the target cursor 120 except for a case where the throwing object 110 collides with a further object arranged between the player character 102 and this target object. In FIG. 4 (also in FIG. 6, FIG. 7, FIG. 8 and FIG. 10), the target cursor 120 is indicated in a black color. Moreover, the first predetermined distance is set in advance by developers, etc. of the game. Moreover, a face and a body direction of the player character 102 are controlled so as to look at a point (target point) that is designated (instructed) by the target cursor 120. Therefore, it is possible to know the target point or a direction of the target point from the face and the direction of the body of the player character 102. A method of determining the target point will be described in detail later.

Furthermore, a route object 122 is displayed on a line segment that connects a movement starting position (starting point) of the throwing object 110 and the target point that is designated by the target cursor 120. In this embodiment, the starting point is set to a center position of the chest of the player character 102. For example, a current position of the player character 102 is set to a center of both legs of the player character 102, and a position that the current position of the player character 102 is made to be moved by a second predetermined distance in a height direction in the virtual game space is set as the starting point. However, the second predetermined distance is a distance from the position of the player character 102 to the center of the chest of the player character 102.

In addition, although the position of the player character 102 and the position of the starting point are set independently in this embodiment, they may be set at the same position.

The throwing object 110 is an item object that the player obtains and possesses in the normal mode, and is thrown by the player character 102 in the throw mode. If the player operates the operating button 16e, the player character 102 throws the throwing object 110. Then, the throwing object 110 moves on the route connecting the starting point and the target point. However, since the throwing object 110 is a sphere in this embodiment, the center of the object 110 moves on the route.

If the throwing object 110 collides with the enemy character 104, the enemy character 104 is fallen. Moreover, if the throwing object 110 collides with a predetermined background object 106, the background object 106 concerned is fallen or destroyed. Moreover, if the throwing object 110 collides with another predetermined background objects 106, a predetermined item appears from the background object 106 concerned, or a predetermined item appears instead of the background object 106 concerned. Furthermore, if the throwing object 110 collides with a still another predetermined background objects 106, the background object 106 concerned bounces back this throwing object 110. Furthermore, if the throwing object 110 collides with a yet another predetermined background objects 106, a display manner (at least one of a color, a pattern and a shape) of the background object 106 concerned is changed. In this specification, hereinafter, the enemy character 104 and the predetermined background object 106 that predetermined processing is to be performed when the throwing object 110 collides therewith will be referred to as a "reaction object".

In addition, in the game of this embodiment, the terrain object and the road object 106a are not included in the reaction object. Therefore, in the game of this embodiment, when the target cursor 120 designates the terrain object or the road object 106a rather than the reaction object, the throwing object 110 is made not to be moved toward the terrain object or the road object 106a.

In other examples, the throwing object 110 may be moved toward the terrain object and the road object 106a. In this case, if the throwing object 110 collides with the terrain object or the road object 106a, the throwing object 110 may be erased without changing the terrain object or the road object 106a.

Moreover, it is assumed that the reaction object does not include an object (for example, the sky object) intended not desired to be made collided with the throwing object 110. Thus, types of the object to be included in the reaction object may be determined in advance according to the content of the game.

In the game of this embodiment, basically, the reaction object designated by the target cursor 120 is determined as an object (target object) to be collided with the throwing object 110. Therefore, the player operates the analog stick 14a to move the target cursor 120 so as to overlap the target cursor 120 with the reaction object desired to be collided with the throwing object 110.

That is, the target cursor 120 is an object for designating or setting the target point in a case where the player character 102 is caused to throw the throwing object 110, and is moved based on an operation by the player. However, the target cursor 120 is moved on a predetermined plane in the virtual game space. The predetermined plane has a predetermined relationship with the virtual camera. For example, the predetermined plane can be set to a near clipping plane that is set for the virtual camera. Although this is an example, and should not be limited, in this embodiment, since the target cursor 120 is made to be displayed on the front (foremost) of the player character 102, the enemy character 104, the background object 106 and the item object, when viewed from the virtual camera, it is necessary to set the predetermined plane in a position in the deep side of the near clipping plane and close to the near clipping plane.

Figure 5A:
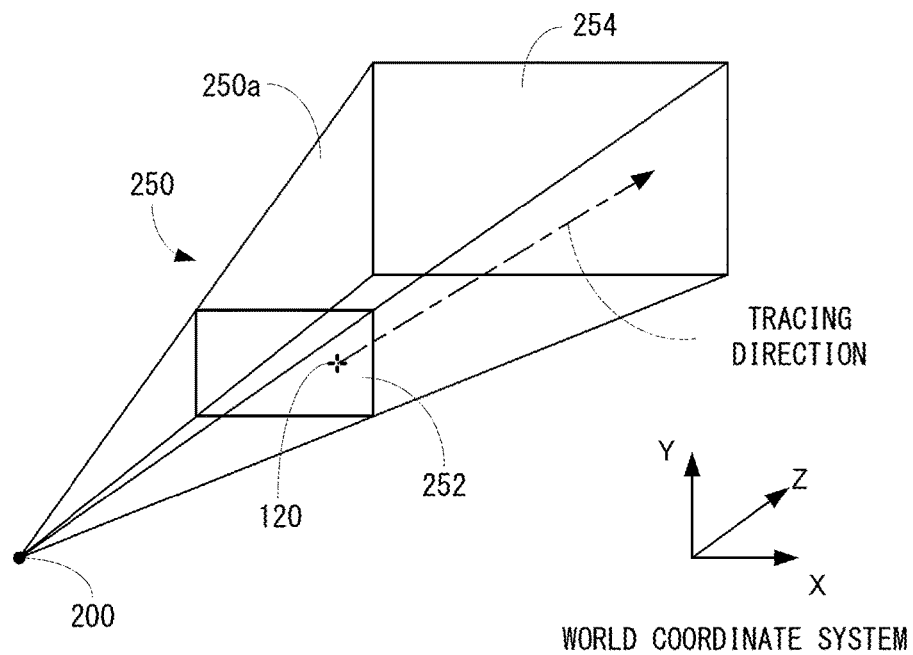
FIG. 5A is a perspective view showing a non-limiting example virtual camera and a non-limiting example visual volume, viewed obliquely rear of the virtual camera.
Figure 5B:
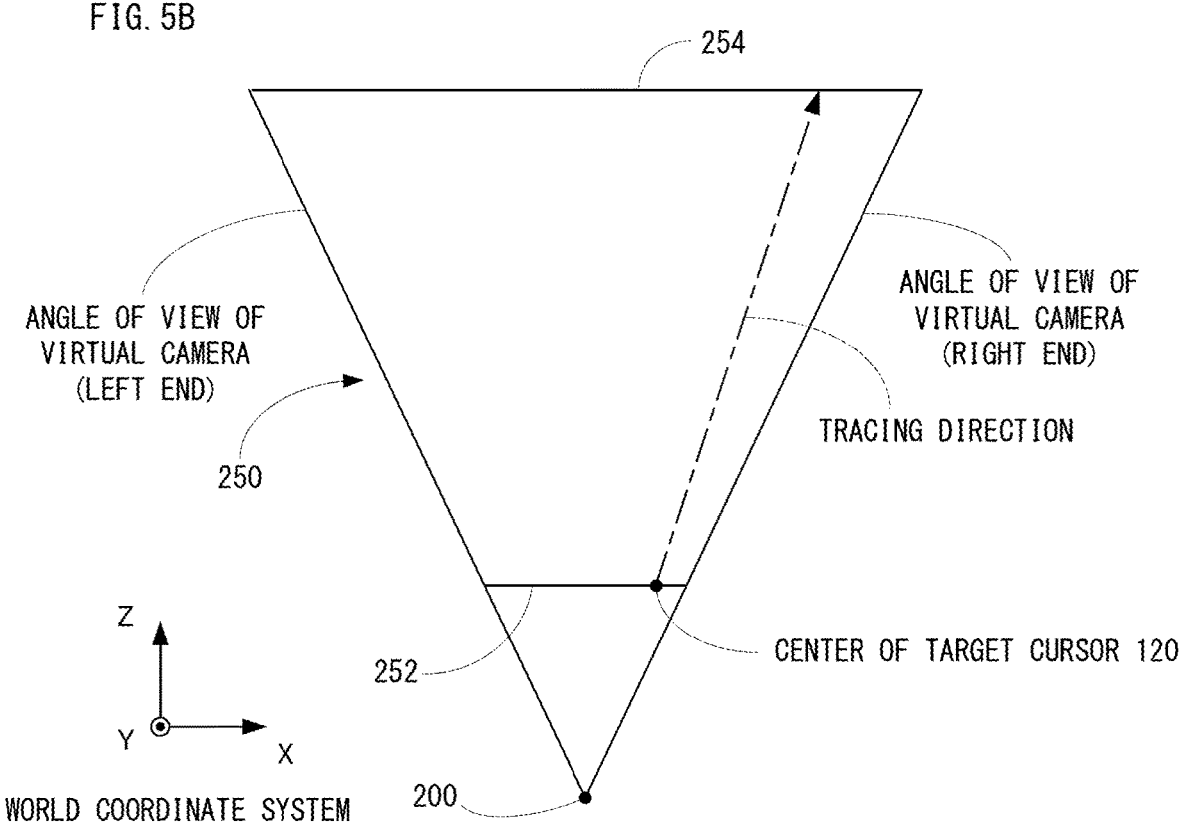
FIG. 5B is an illustration view of the virtual camera and the visual volume shown in FIG. 5A, viewed from the just above.

FIG. 5A is an illustration view showing a non-limiting example pyramidal cone 250 that is an imaging range of the virtual camera 200, when viewed diagonally rear of the virtual camera 200. FIG. 5B is an illustration view showing the pyramidal cone 250 that is a part of three-dimensional virtual game space in a bird's eye view from directly above. However, a portion of a truncated pyramid sandwiched between the near clipping plane 252 and a far clipping plane 254 in the pyramidal cone 250 is a visual volume. Moreover, in FIG. 5A and FIG. 5B, the objects other than target cursor 120 are omitted.

As shown in FIG. 5A and FIG. 5B, when the three-dimensional virtual game space is viewed from the virtual camera 200, the near clipping plane 252 and the far clipping plane 254 are set, and the pyramidal cone (quadrangular pyramid) 250 is determined by the virtual camera 200 (view point) and the far clipping plane 254.

However, an inclination of an oblique side of the pyramidal cone (an angle of view of the virtual camera 200) is determined by a distance between the virtual camera 200 and the far clipping plane 254 and a size of the far clipping plane 254.

Moreover, as shown in FIG. 5A and FIG. 5B, when an object for determination having a predetermined size and a predetermined shape (first determination object) is moved from a position (center position) of the target cursor 120 toward the far clipping plane 254 (trace check) on an extension in a direction from the virtual camera 200 toward a position of the target cursor 120, the target object that is designated by the target cursor 120 is determined by determining whether the first determination object collides with the reaction object (first collision determination processing). For example, the first determination object is a spherical object whose diameter is a length in the vertical or horizontal direction of a blank area formed with four (4) bars constituting the target cursor 120.

The reaction object with which the first determination object collides firstly is determined as a target object. Moreover, a point at which the first determination object collides with the reaction object is determined as a target point that the throwing object 110 is made to be collided with. When the first determination object does not collide with the reaction object, an intersecting point of a plane that includes the position of the player character 102 and is perpendicular to the line of sight of the virtual camera 200 (hereinafter, called "player line plane") and a line from the virtual camera 200 toward the position of the target cursor 120 is calculated, and the calculated intersecting point is determined as the target point.

In addition, in an example of permitting that the throwing object 110 moves toward the terrain object and the road object 106a and collides therewith, when the first determination object collides with the terrain object and the road object 106a without colliding with the reaction object, a point of colliding on the terrain object or the road object 106a is determined as a target point.

Moreover, although the player line plane is assumed to be perpendicular to the line of sight of the virtual camera 200, it is not necessary to be always perpendicular to the line of sight of the virtual camera 200, and is a plane orthogonal to a horizontal plane independent of a direction of the virtual camera 200.

Furthermore, in the first collision determination processing, it is not necessary to actually move the first determination object, and it is determined whether collision occurs by calculation on the assumption that the first determination object is made to be moved. Hereinafter, in this specification, this is also applied to a case where collision determination is performed by moving a determination object.

Returning to FIG. 4, the route object 122 is an object for presenting to the player, before the throwing object 110 is thrown, a route that the throwing object 110 thrown by the player character 102 is moved. The route object 122 is an object that a plurality of spherical objects 122a are arranged at equal intervals on a straight line, and each spherical object 122a is loop-moved in a third predetermined distance at a constant speed. That is, each spherical object 122a starts a movement again from each movement start position (appearance position) when being moved by the third predetermined distance. However, a direction that each spherical object 122a is moved is the same as a direction that the throwing object 110 is moved.

A shadow 124 is displayed corresponding to each spherical object 122a of the route object 122. An object for collision determination (second determination object) is moved in vertically downward from each spherical object 122a, and it is determined whether the second determination object collides with the terrain object or other objects (second collision determination processing). A position that the second determination object collides with the terrain object or other objects is determined as a position of the shadow 124, and the shadow (round shadow) 124 is displayed at the position of the shadow 124. Specifically, by making drawing of the shadow 124 with Material, the shadow 124 is displayed with Decal on a surface of the terrain object or other objects with which the second determination object collides. Although illustration is omitted, the second determination object is a spherical object of the same or almost same shape and size as those of the spherical object 122a, for example.

Thus, since each shadow 124 of not only the route object 122 but a plurality of spherical objects 122a that constitute the route object 122 are displayed, that is, since the shadow of the route object 122 is also displayed, the route on which the throwing object 110 is moved can be shown intelligibly.

In addition, in this embodiment, in order to show intelligibly the shadow 124 of each spherical object 122a constituting the route object 122, shadows of the player character 102, the enemy character 104 and the background object 106 are omitted.

FIG. 6 is an illustration view showing another non-limiting example game screen 100 in the throw mode. FIG. 6 shows the game screen 100 when the target cursor 120 is moved onto the enemy character 104 in the game screen 100 shown in FIG. 4.

In this case, the enemy character 104 (reaction object) is determined as a target object by performing the above-described first collision determination processing. Moreover, a point that the first determination object collides with the enemy character 104 is determined as a target point, the route object 122 is placed (displayed) on a line segment that connects the starting point and the target point, and the shadow 124 of each spherical object 122a is displayed by performing the second collision determination processing. Moreover, a direction of the player character 102 is set in a direction facing the target point, and the player character 102 is turned to the set direction.

Moreover, a mark object 126 is displayed in the game screen 100 shown in FIG. 6. This mark object 126 is an object of a mark that indicates a position (collision predicting point) that collision of the throwing object 110 is predicted when the throwing object 110 is thrown toward the target point. Moreover, the mark object 126 is an object that a pattern of a target is expressed, and is displayed so that the center overlaps with the collision predicting point. The mark object 126 is displayed in front (front side) of the objects except the target cursor 120.

An object for determination (third determination object) is moved toward the target point from the starting point, and it is determined whether the third determination object collides with the reaction object (third collision determination processing). A position that the third determination object collides with the reaction object is determined as the collision predicting point. The third determination object is a spherical object of the same or almost same shape and size as those of the throwing object 110.

Moreover, an emphasis object 130 is displayed so that a contour (visible outline) of the reaction object (here, the enemy character 104 of the target object) including the collision predicting point can be emphasized. In this embodiment, the emphasis object 130 is an object that the contour of the target object is indicated with a thick line in a bright color. However, this is an example and should not be limited. For example, the emphasis object 130 that an object of the same shape as the target object is painted with a predetermined color or pattern may be displayed. Moreover, the emphasis object 130 may be blinked by repeating display/non-display.

Therefore, it is possible to notify the player the reaction object with which the throwing object 110 collides when the throwing object 110 concerned is thrown. This emphasis object 130 is displayed in front of objects other than target cursor 120 in the virtual game space. Therefore, in the virtual game space, the emphasis object 130 may be arranged in the front side of the objects other than target cursor 120, and may be drawn in front of objects other than target cursor 120 irrespective of an arranged position.

FIG. 7 is an illustration view showing a still another non-limiting example game screen 100 in the throw mode. FIG. 7 shows another enemy character 104 is further displayed on a right side of the center in the game screen 100 shown in FIG. 6. For convenience of description, the enemy character 104 that was also displayed on the game screen 100 in FIG. 6 is referred to as "enemy character 104a", and the another enemy character 104 is referred to as "enemy character 104b".

In the game screen 100 of FIG. 7, since the target cursor 120 is located on the enemy character 104b, and by performing the above-described first collision determination processing, the enemy character 104b (reaction object) is determined as a target object. Moreover, a point that the first determination object collides with the enemy character 104b is determined as a target point, the route object 122 is placed (displayed) on a line segment that connects the starting point and the target point, and the shadow 124 of each spherical object 122a is displayed by performing the second collision determination processing. Moreover, a direction of the player character 102 is set in a direction facing the target point, and the player character 102 is turned to the set direction.

In the game screen 100 shown in FIG. 7, another target object (here, the enemy character 104a) is arranged between the player character 102 and the target object, and when the above-described third collision determination processing is performed, the third determination object collides with the enemy character 104a (reaction object). As described above, a position that the third determination object collides with the reaction object is determined as a collision predicting point, and the mark object 126 is displayed at that point. Moreover, the emphasis object 130 is displayed on the contour of the enemy character 104a.

In this case, the collision predicting point is not a target object and is another reaction object to be arranged (displayed) between the player character 102 and the target object. Hereinafter, this another reaction object is called a "collision prediction object".

Thus, when the collision predicting point is a point on the collision prediction object, the throwing object 110 does not collide with the target object. Therefore, in such a case, the target cursor 120 is displayed in grayout, and one or more spherical objects 122a among the plurality of spherical objects 122a constituting the route object 122, which being arranged between the collision prediction object and the target object are displayed in grayout. That is, a display manner of the target cursor 120 differs dependent on whether the collision prediction object exists or not. Similarly, a display manner of the route object 122 also differs. Moreover, as for the route object 122, it can also be said that a display manner of the spherical object 122a arranged between the starting point and the collision predicting point and a display manner of the spherical object 122a arranged between the collision predicting point and the target point are different from each other.

Since the mark object 126 is displayed on the collision predicting point, it is possible to know in advance that the throwing object 110 collides with the reaction object (collision prediction object) other than the target object that is designated by the target cursor 120.

As described using the game screen 100 of FIG. 6 and FIG. 7, it is possible to say that it is determined also on whether another reaction object exists between the player character 102 and the target object by performing the third collision determination processing.

FIG. 8 is an illustration view showing a yet another non-limiting example game screen 100 in the throw mode. The game screen 100 shown in FIG. 8 is a screen about a scene different from a scene of the game screen 100 shown in FIG. 4.

In the game screen 100 shown in FIG. 8, two enemy characters 104 (104a, 104b) exist forward in an advancing direction of the player character 102, and one enemy character 104a is displayed on the right side of the game screen 100 and the other enemy character 104b is displayed in the center of the game screen 100. Moreover, the plants object 106c is displayed in front of the enemy character 104b and the road object 106a. Therefore, the enemy character 104b is hidden by the plants object 106c. Furthermore, the building object 106b is displayed on the deep side of the enemy character 104a.

The target cursor 120 designates the building object 106b, and thus, a target object is this building object 106b. Therefore, the player character 102 faces the target point on the building object 106b designated by the target cursor 120. Although the enemy character 104b and the plants object 106c are displayed between the player character 102 and the building object 106b in the game screen 100 shown in FIG. 8, the route object 122 is displayed in the deep side of the enemy character 104b. Moreover, the third determination object collides with the building object 106b without colliding with the enemy character 104b and the plants object 106c. Therefore, the mark object 126 is displayed centered on the collision predicting point on the building object 106b. Therefore, the display manner of the target cursor 120 and the display manner of the route object 122 are not changed. Moreover, the emphasis object 130 is displayed so as to emphasize the contour of this building object 106b.

FIG. 9 shows a non-limiting game screen 100 that the target cursor 120 is set to the enemy character 104a in the game screen 100 shown in FIG. 8 by operating the analog stick 14a by the player.

Although the target cursor 120 designates the enemy character 104a in the game screen 100 shown in FIG. 9, the enemy character 104b is arranged between the player character 102 and the enemy character 104a (target object), and the third determination object collides with the enemy character 104b. That is, the enemy character 104b is a collision prediction object, and the emphasis object 130 is displayed in front (front side) of the plants object 106c so that the contour of the enemy character 104b is emphasized. Moreover, the display manner of the target cursor 120 and the display manner of the route object 122 are changed. As described above, the target cursor 120 is displayed in grayout. Moreover, the spherical objects 122a among the plurality of spherical objects 122a constituting the route object 122, which being placed from the collision predicting point to the target point are displayed in grayout.

Thus, by controlling the position of the target cursor 120, it is possible to designate even a reaction object invisible in the game screen 100 as a collision prediction object, and to make the throwing object 110 collide the reaction object. Although illustration etc. is omitted, the position of the player character 102 or/and the position of the target cursor 120 may be controlled.

FIG. 10 is an illustration view showing a further non-limiting example game screen 100 in the throw mode. The game screen 100 shown in FIG. 10 is a screen about a scene different from the scenes of the game screen 100 shown in FIG. 4 and FIG. 8.

In an example shown in FIG. 10, in lower right of the game screen 100, the plants object 106c (1060) is displayed in front of than the road object 106a. Moreover, in the center of the game screen 100, the two animal objects 106d are displayed side by side, and other two plants objects 106c (1062) are displayed on the deep side of the two animal objects 106d.

In this FIG. 10, the target cursor 120 designates the plants object 1060 arranged (displayed) in the front side of the road object 106a, and therefore, a target object is this plants object 1060. Therefore, the player character 102 faces the target point on the plants object 1060 designated by the target cursor 120. Moreover, the mark object 126 is displayed at the collision predicting point on the reaction object (here, the plants object 1060) with which the third determination object collides. In the game screen 100 shown in FIG. 10, since other reaction objects are not arranged (displayed) between the player character 102 and the target object (here, the plants objects 1060), the display manner of the target cursor 120 and the display manner of the route object 122 are not changed. Furthermore, the emphasis object 130 is displayed so as to emphasize the contour of this plants object 1060 designated by the target cursor 120.

Therefore, it is possible to aim at the reaction object arranged in front of the player character 102, and to make the throwing object 110 collide with the reaction object.

However, even if it is a reaction object, when being too close to the near clipping plane 252 (or the virtual camera 200), such a reaction object is excluded from a candidate of a target object that can be designated by the target cursor 120. This is because an object that is to be excluded from the target object that can be designated by the target cursor 120 (non-target object) is displayed or not displayed in the game screen 100 depending on the position of the virtual camera 200 or the like.

Figure 11:
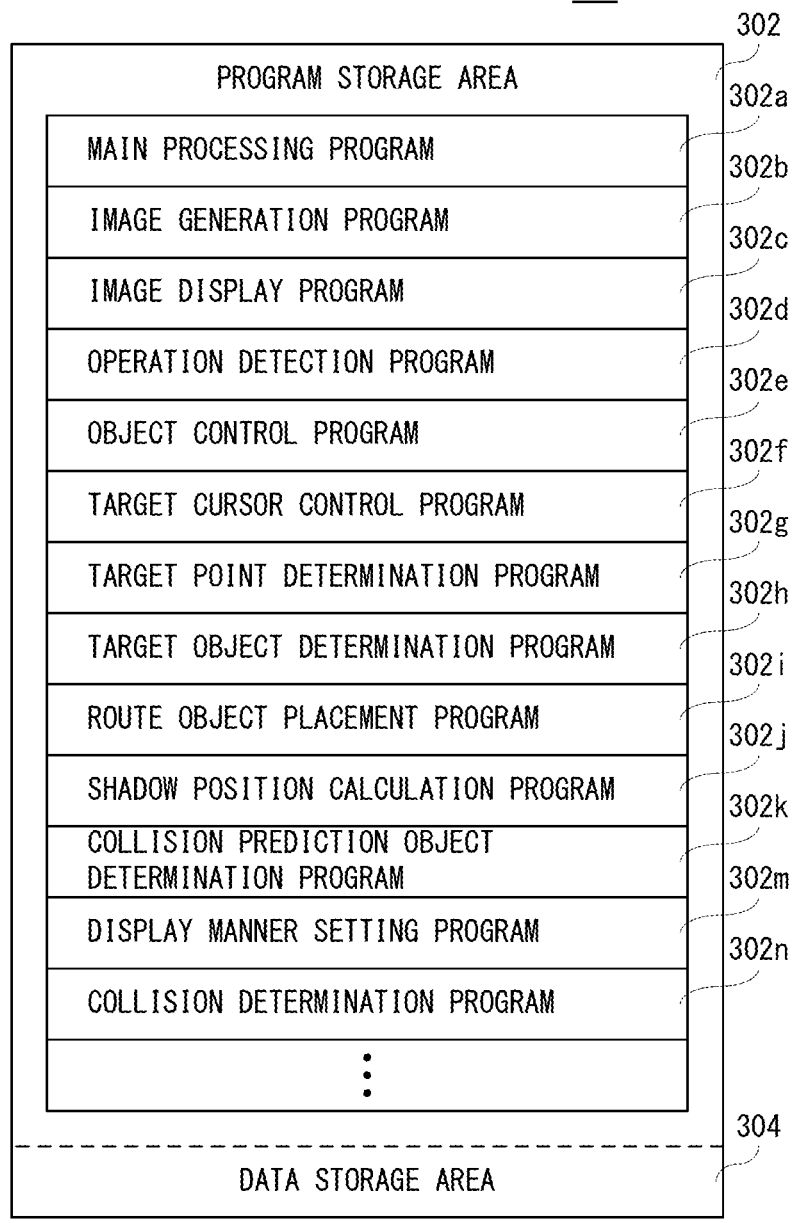
FIG. 11 is an illustration view showing a non-limiting example memory map of a RAM shown in FIG. 2.

FIG. 11 and FIG. 12 are illustration views showing a non-limiting example memory map 300 of the RAM 32 of the game apparatus 10 shown in FIG. 2. As shown in FIG. 11, the RAM 32 includes a program storage area 302 and a data storage area 304. The program storage area 302 is stored with a program for an application of the game of this embodiment (game program), and the game program includes a main processing program 302a, an image generation program 302b, an image display program 302c, an operation detection program 302d, an object control program 302e, a target cursor control program 302f, a target point determination program 302g, a target object determination program 302h, a route object placement program 302i, a shadow position calculation program 302j, a collision prediction object determination program 302k, a display manner setting program 302m, a collision determination program 302n, etc.

The main processing program 302a is a program for processing a main routine of entire processing for the game of this embodiment (entire game processing).

The image generation program 302b is a program for generating image data of a game image using image generation data 304b. For example, a virtual game space is drawn, the drawn virtual game space is subjected to perspective projection transformation, and image data of the game image corresponding to the game screen 100 is generated (drawn). The image display program 302c is a program for outputting the image data of the game image generated according to the image generation program 302b to the display device 18.

The operation detection program 302d is a program for detecting operation data that is input from the input device 38 based on an operation by the player. The detected operation data is stored in an operation data buffer 304a described later.

The object control program 302e is a program for causing the player character 102 to perform movement or the like according to the operation data, or for causing the enemy character 104 to be arranged (to appear) or to perform movement or the like without following the operation data. The object control program 302e moves, in the normal mode, the player character 102 in a right and left, an up and down (a depth direction), or obliquely when the operation data detected according to the operation detection program 302d indicates an operation of the operating buttons 14b-14e. Moreover, the object control program 302e makes the player character 102 jump in the normal mode when the operation data indicates an operation of the operating button 16e. Moreover, the object control program 302e makes, in the throw mode, the player character 102 throw the throwing object when the detected operation data indicates an operation of the operating button 16e.

In addition, when the operation data detected according to the operation detection program 302d indicates an operation of the operating button 16c, or according to a progress situation of the game, the main processing program 302a switches (changes) a mode between the normal mode and the throw mode.

The target cursor control program 302f is a program for making, in the throw mode, the target cursor 120 move according to a tilt direction and a tilt amount of the analog stick 14a when the operation data detected according to the operation detection program 302d indicates an operation of the analog stick 14a.

The target point determination program 302g is a program for performing the above-described first collision determination processing based on a current position of the target cursor 120, and for determining the target point designated by the target cursor 120 according to a result of the first collision determination processing.

The target object determination program 302h is a program for determining the reaction object designated by the target cursor 120 as a target object. That is, the reaction object including the target point is determined as the target object.

The route object placement program 302i is a program for placing the route object 122 on the line segment that connects the starting point of the throwing object 110 and the target point determined according to the target point determination program 302g. However, the route object placement program 302i is also a program for making a plurality of spherical objects 122a constituting the route object 122 move so as to circulate in the third predetermined distance.

The shadow position calculation program 302j is a program for calculating, by performing the above-described second collision determination processing, positions of respective shadows 124 of the plurality of spherical objects 122a that constitute the route object 122 placed according to the route object placement program 302i.

The collision prediction object determination program 302k is a program for performing the above-described third collision determination processing and for calculating the collision predicting point according to a result of the third collision determination processing, and for determining, when the third collision determination object collides with the other reaction object between the player character 102 and the target object, the other reaction object including collision predicting point as the collision prediction object.

The display manner setting program 302m is a program for setting a color in displaying (drawing) the target cursor 120 and a color in displaying (drawing) each of the plurality of spherical objects 122a included in the route object 122.

The collision determination program 302n is a program for determining, when the throwing object 110 is thrown by the player character 102 in the throw mode, whether the throwing object 110 collides with the reaction object (performing the fourth collision determination processing). In the fourth collision determination processing, it is determined whether an object for determination (fourth determination object) that is set to the throwing object 110 collides with the reaction object. The fourth determination object is a spherical object of the same or, almost same shape and size as those of the throwing object 110.

Although illustration is omitted, the program storage area 302 is stored with a sound output program for generating and outputting a sound required for the game, a communication program for performing communication with other game apparatuses or computers, a save program for saving game data in the nonvolatile memory, etc.

As shown in FIG. 12, the data storage area 304 is stored with an operation data buffer 304a. The operation data buffer 304a is stored with the operation data detected by the operation detection program 302d in a time series. The operation data stored in the operation data buffer 304a is eliminated from the operation data buffer 304a when having been used for processing of the processor 30.

Moreover, the data storage area 304 is stored with the image generation data 304b, player character data 304c, possession item data 304d, target cursor position data 304e, non-target data 304f, starting point data 304g, target point data 304h, target object data 304i, route object data 304j, shadow position data 304k, collision prediction point data 304m, collision prediction object data 304n, collision object data 304p, etc.

The operation data buffer 304a is an area for temporarily storing the operation data from the input device 38. The image generation data 304b is data of the polygon data, the texture data, etc. for generating the image data of the game screen 100.

The player character data 304c includes direction data indicative of a current direction and coordinate data indicative of a three-dimensional current position of the player character 102. The player character data 304c may include status data indicative of a state of the player character 102.

The possession item data 304d is data about an item (throwing object 110 etc.) that the player character 102 possesses and the number of them. The target cursor position data 304e is coordinate data indicative of a three-dimensional current position of the target cursor 120.

The non-target data 304f is data about identification information of non-target reaction object. For example, the reaction object existing in a position that a distance with the near clipping plane 252 (or the virtual camera 200) is shorter (closer) than the fourth predetermined distance is determined as the non-target object.

The starting point data 304g is coordinate data indicative of a three-dimensional position of the starting point of the throwing object 110, and is determined based on a three-dimensional current position of the player character 102. The starting point of the throwing object 110 indicated by the starting point data 304g is a position (center position of chest) that a position (three-dimensional position) of the player character 102 is moved by the second predetermined distance in a height direction (plus direction of Y-axis).

The target point data 304h is coordinate data of the target point (three-dimensional position) designated by the target cursor 120. The target object data 304i is data about identification information of the reaction object that is determined as a target object.

The route object data 304j is data about the route object 122, and is coordinate data of three-dimensional position of each of the plurality of spherical objects 122a that constitute the route object 122, and is data about information of a color to be applied to each of the plurality of spherical objects 122a. The shadow position data 304k is coordinate data about a position of the shadow 124 corresponding to each of the plurality of spherical objects 122a that constitute the route object 122.

The collision prediction point data 304*m* is coordinate data of a position closest to the starting point of the throwing object 110 among the points (positions) that the route object 122 collides. The collision prediction object data 304*n* is data about identification information of an object (collision prediction object) including a point indicated by the collision prediction point data 304*m*. The collision object data 304*p* is data about identification information of the collision object with which the throwing object 110 thrown by the player character 102 collides.

Moreover, a throw flag 304*q* is provided in the data storage area 304. The throw flag 304*q* is a flag for determining whether the throw mode is set, and is turned on in the throw mode and turned off in the normal mode.

Although illustration is omitted, the data storage area 304 is stored with other data required for the game processing (information processing), and is provided with other flags and counters (timer(s)) required for the game processing (information processing).

Figure 13:
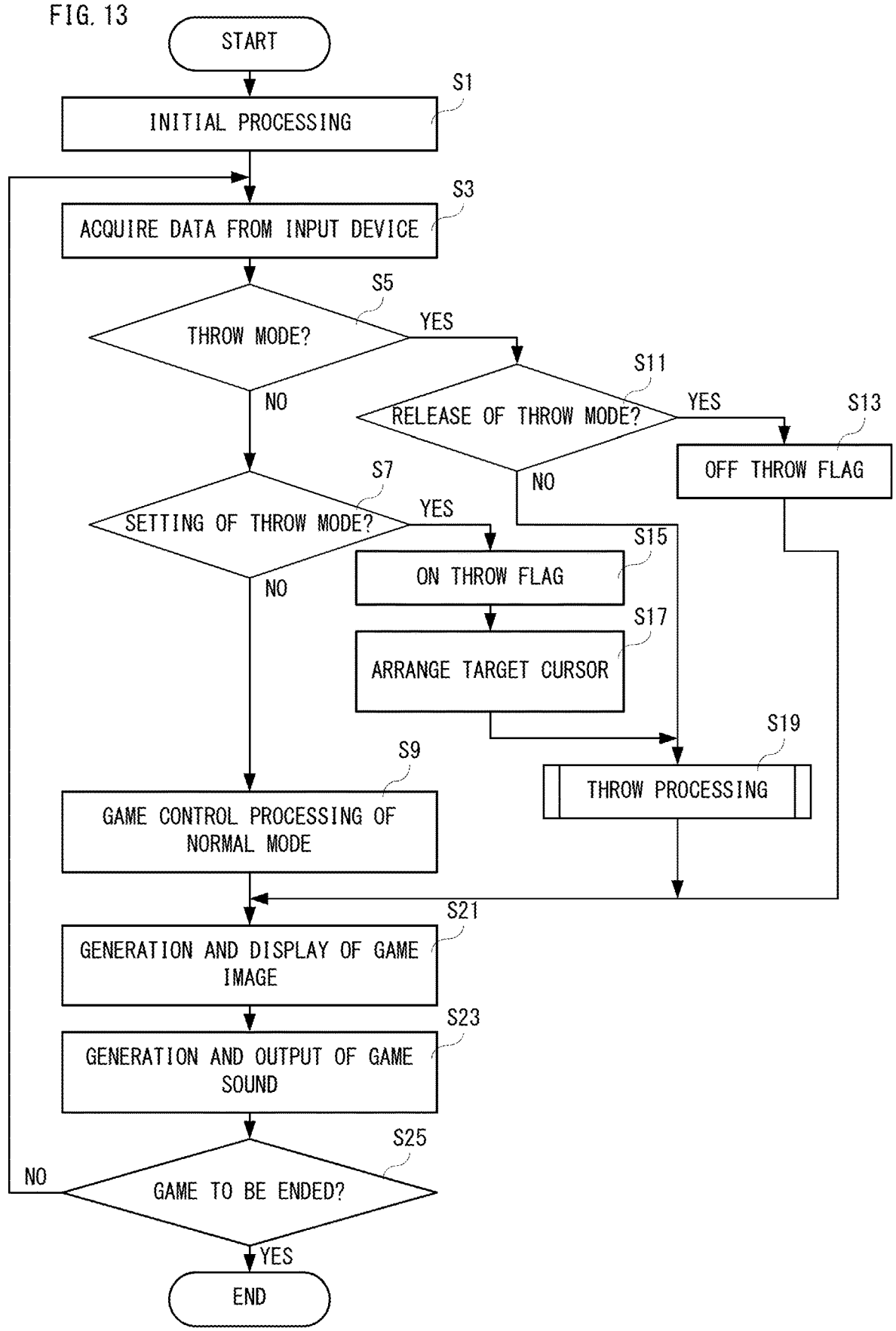
FIG. 13 is a flowchart showing non-limiting example entire game processing of a processor shown in FIG. 2.

FIG. 13 is a flow chart showing non-limiting example entire game processing performed by the processor 30 shown in FIG. 2. In addition, processing in each of respective steps of the flowchart shown in FIG. 13 is a mere example, and if the same or similar result can be obtained, a processing order of the respective steps may be changed. This is also the same also for throw processing shown in FIG. 14-FIG. 16.

If the power supply of the game apparatus 10 is turned on, prior to execution of the entire game processing, the processor 30 executes a boot program stored in a boot ROM not shown, whereby respective components such as the RAM 32, etc. can be initialized. Then, the game program is read from a nonvolatile memory etc. to be stored into the RAM 32, and execution of the game program concerned is started by the processor 30.

As shown in FIG. 13, if the entire game processing is started, the processor 30 performs initial processing in a step S1. In the initial processing, for example, the processor 30 constructs a virtual game space for generating and displaying the game image, and arranges respective character objects such as the player character 102, the enemy character 104, etc. appearing in this virtual game space at their initial positions, and at predetermined positions in the virtual game space arranges the background objects 106. Furthermore, the processor 30 sets initial values of the various parameters used by the game control processing (S5-S19). Moreover, the processor 30 turns off the throw flag 304*q* in a step S1.

Subsequently, the processor 30 acquires the operation data that is input from the input device 38 in a step S3, and performs the game control processing in the steps S5-S19. It is determined, in a step S5, whether the throw mode is set. Here, the processor 30 determines whether the throw flag 304*q* is turned on.

If "YES" is determined in the step S5, that is, if it is in the throw mode, the process proceeds to a step S11. On the other hand, if "NO" is determined in the step S5, that is, if it is not in the throw mode, it is determined, in a step S7, it is determined whether the throw mode is to be set. Here, the processor 30 determines whether the operation data stored in the operation data buffer 304*a* indicates an operation of the operating button 16*c*. This is the same in the step S11 described later.

If "NO" is determined in the step S7, that is, if the throw mode is not to be set, the game control processing of the normal mode is performed in a step S9, and then, the process proceeds to a step S21. In the step S9, according to the operation data, for example, the processor 30 moves the player character 102, or/and makes the player character 102 perform an arbitrary action. At this time, the processor 30 moves the virtual camera 200 so as to maintain a predetermined positional relationship with the player character 102. However, if the player character 102 is moved, the current position of the player character 102 is updated. Along with this, the starting point data 304*g* is also updated.

Moreover, without following the operation data, the processor 30 moves the non-player characters such as the enemy character 104 etc., or/and makes the non-player character perform an arbitrary action. Furthermore, the processor 30 determines victory and defeat or ranking of the player character 102, or/and determines whether a game clear or a game over. Furthermore, the processor 30 changes, according to the operation data, at least one of the position, the direction and the angle of view of the virtual camera 200. However, although the virtual camera 200 is usually located in the virtual game space so as to gaze at the player character 102 and maintain the predetermined positional relationship with the player character 102 concerned, when at least one of the position, the direction and the angle of view is changed by an operation of the player, the virtual camera 200 is located in a position or/and direction after changed and is set at an angle of view after changed. However, even when the player performs no operation, at least one of the position, the direction and the angle of view of the virtual camera 200 may be changed automatically (forcibly) depending on the context of the game.

If "YES" is determined in the step S7, that is, if the throw mode is to be set, the throw flag 304*q* is turned on in a step S15, and the target cursor 120 is arranged in a step S17. The, the processor 30 performs throw processing (FIG. 14-FIG. 16) in a step S19, and the process proceeds to the step S21. However, in the step S17, the processor 30 arranges the target cursor 120 in a position that is separated from the player character 102 by the first predetermined distance in the advancing direction of the player character 102.

Moreover, it is determined, in the step S11, whether the throw mode is to be released. That is, it is determined whether the normal mode is to be set. Specifically, the processor 30 determines whether the operating button 16*c* is operated in the throw mode. If "YES" is determined in the step S11, that is, if the normal mode is to be set, the throw flag 304*q* is turned off in a step S13, the process proceeds to the step S21. On the other hand, if "NO" is determined in the step S11, that is, the normal mode is not to be set, the process proceeds to the step S19.

In the step S21, the processor 30 generates the game image according to a result of the game control processing of the steps S5-S19, and displays the generated game image on the display device 18. Generation processing of the game image is performed mainly by a GPU included in the processor 30. In a next step S23, the processor 30 generates the game sound according to the result of the game control processing of the steps S5-S19, and outputs the generated game sound. That is, through the processing in the step S21 and the step S23, image data of the game image is output to the display device 18 from the display driver 40, and sound data of the game sound is output to the speaker 44 through the D/A converter 42.

Then, in a step S25, the processor 30 determines whether the game is to be ended. Determination in the step S25 is made, for example, based on whether the game is over or whether the player gives an instruction to stop the game.

If "NO" is determined in the step S25, that is, the game is not to be ended, the process returns to the step S3. On the other hand, if "YES" is determined in the step S25, that is, the game is to be ended, the entire game processing is terminated.

Figure 14:
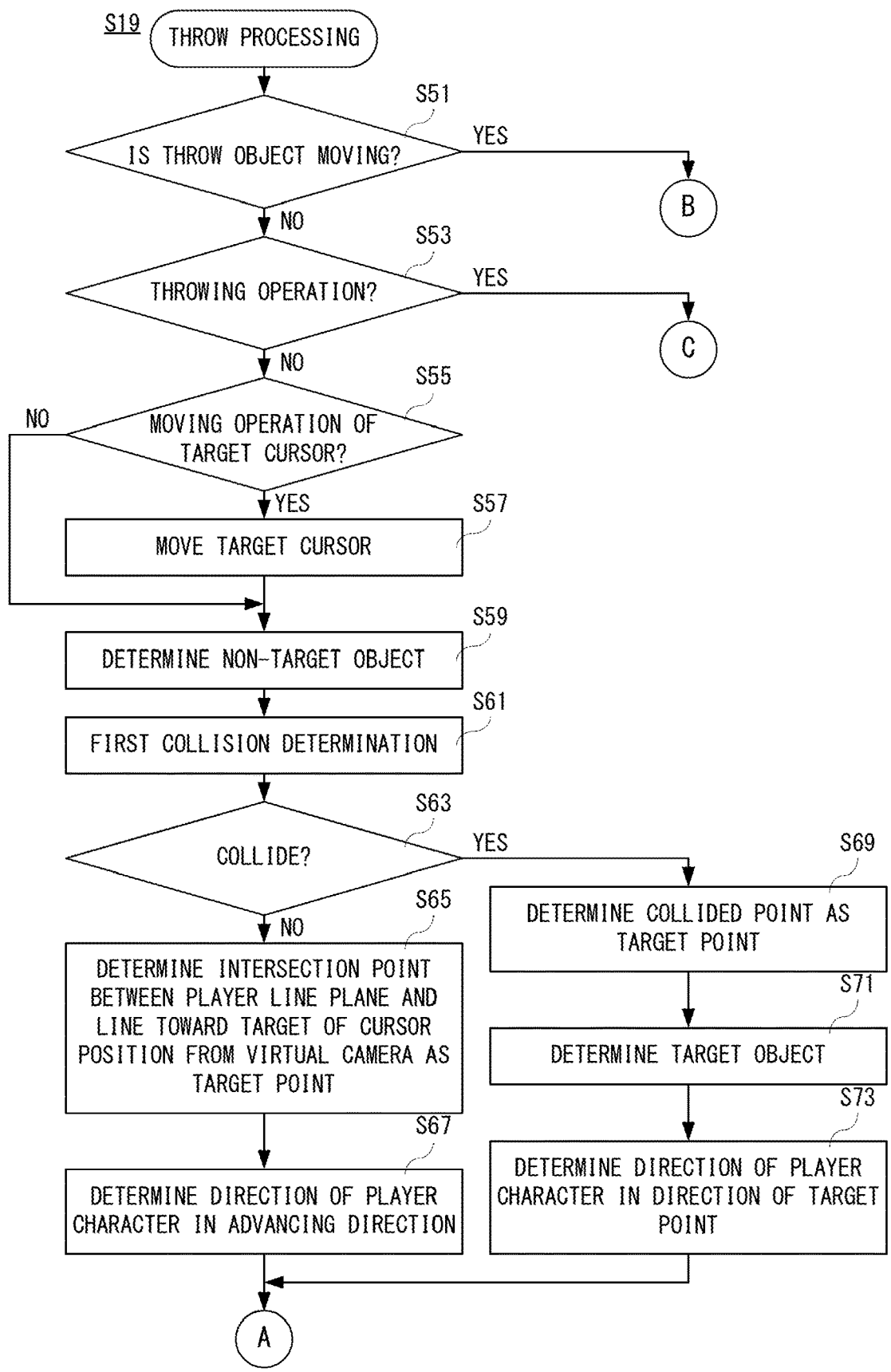
FIG. 14 is a flowchart showing a part of non-limiting example throw processing of a processor shown in FIG. 2.
Figure 15:
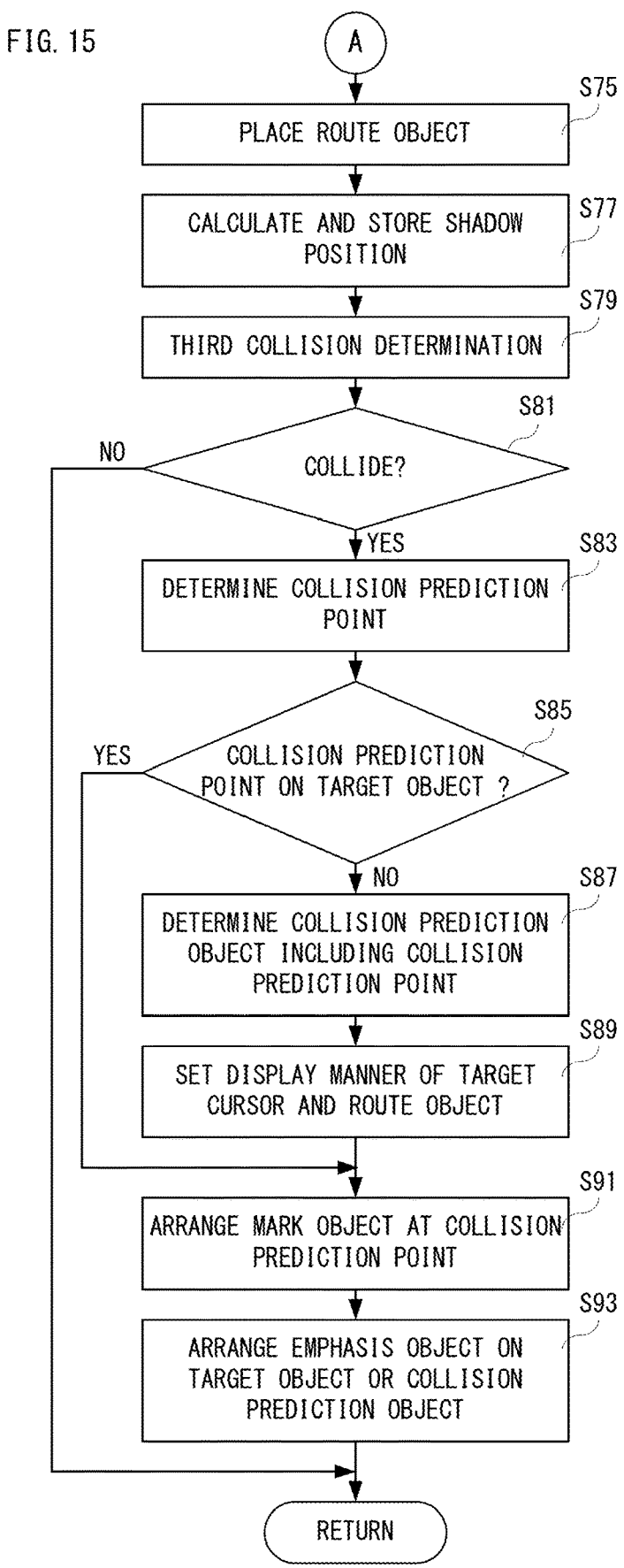
FIG. 15 is a flowchart showing another part of the throw processing of a processor shown in FIG. 2, following FIG. 14.

FIG. 14-FIG. 16 are flow charts showing non-limiting example throw processing of step S19 shown in FIG. 13.

As shown in FIG. 14, if the throw processing is started, the processor 30 determines, in a step S51, whether the throwing object 110 is moving. If "YES" is determined in the step S51, that is, if it is during movement of the throwing object 110, the process proceeds to a step S95 shown in FIG. 16. On the other hand, if "NO" is determined in the step S51, that is, if it is not during movement of the throwing object 110, it is determined, in a step S53, whether it is a throw operation. Here, the processor 30 determines whether the operation data detected in the step S3 indicates an operation of the operating button 16e.

If "YES" is determined in the step S53, that is, if it is the throw operation, the proceeds to a step S97 shown in FIG. 16. On the other hand, if "NO" is determined in the step S53, that is, if it is not the throw operation, it is determined, in a step 55, whether it is a moving operation of the target cursor 120. Here, the processor 30 determines whether the operation data detected in the step S3 indicates an operation of the analog stick 14a.

If "NO" is determined in the step S55, that is, if it is not the moving operation of the target cursor 120, the process proceeds to a step S59. On the other hand, if "YES" is determined in the step S55, that is, if it is the moving operation of the target cursor 120, in a step S57, the target cursor 120 is made to be moved in a tile direction of the analog stick 14a by a distance according to a tilt amount of the analog stick 14a, and the process proceeds to the step S59.

In the step S59, a non-target object is determined. Here, the processor 30 determines an object existing in a position that a distance with the near clipping plane 252 (virtual camera 200) is less than the fourth predetermined distance as the non-target object. At this time, identification information of one or more non-target objects are stored as the non-target data 304f in the data storage area 304.

In a next step S61, the first collision determination processing is performed. Here, the processor 30 determines whether the first determination object collides with the reaction object while assuming that the first determination object is made to be moved from an arrangement position of the target cursor 120 in a direction of the Z-axis. However, when the first determination object collides with the far clipping plane 254 without colliding with the reaction object, the first collision determination processing is ended without determination of the target object.

In a subsequent step S63, it is determined whether the first determination object collides with the reaction object. If "NO" is determined in the step S63, that is, if the first determination object does not collide with the reaction object, in a step S65, an intersecting point of the player line plane and the line toward the position of the target cursor 120 from the virtual camera 200 is determined as the target point. In this step S65, the processor 30 stores (updates) the target point data 304h corresponding to the determined target point in the data storage area 304. This is the same for a step S69 described later.

In a next step S67, a direction of the player character 102 is determined in the advancing direction of the player character 102 (right direction, in this embodiment), and the process proceeds to a step S75 shown in FIG. 15. In the step S67, the processor 30 determines the direction of the player character 102 so that the line of sight and the front of the body of the player character 102 may be turned to the advancing direction, and updates the direction data included in the player character data 304c. This is the same for a step S73 described later.

On the other hand, if "YES" is determined in the step S63, that is, if the first determination object collides with the reaction object, a point of collision is determined as the target point in a step S69. In a next step S71, the reaction object including the target point determined in the step S69 is determined as the target object, and in the step S73, a direction of the player character 102 is determined to a direction of the target point, and then, the process proceeds to the step S75. In the step S69, the processor 30 stores (updates) identification information of the target object in the data storage area 304 as the target object data 304i.

As shown in FIG. 15, in the next step S75, the route object 122 is placed on a line segment that connects the starting point that is indicated by the starting point data 304g and the target point that is indicated by the target point data 304h. Thereafter, each spherical object 122a constituting the route object 122 is moved so as to circurate in the third predetermined distance until the throwing object 110 is thrown.

Subsequently, in a step S77, a position of a shadow of each of the plurality of spherical objects 122a that constitute the route object 122 is calculated, and the calculated position of the shadow 124 is stored. That is, the processor 30 performs the second collision determination processing, calculates the position of the terrain in a right downward direction of each spherical object 122a as a position of the shadow 124, and stores (updates) the position data corresponding to the calculated position of the shadow 124 in the data storage area 304 as the shadow position data 304k.

In a next step S79, the third collision determination processing is performed. In the third collision determination processing, it is determined whether the third determination object collides with the reaction object while assuming that the third determination object is made to be moved on a line that connects the starting point and the target point. Then, it is determined, in a step S81, whether the third determination object collides with the reaction object in the third collision determination processing.

If "NO" is determined in the step S81, that is, if the third determination object does not collide with the reaction object in the third collision determination processing, the process proceeds to a step S93. On the other hand, if "YES" is determined in the step S81, that is, if the third determination object collides with the reaction object in the third collision determination processing, in a step S83, a point that the third determination object collides with the reaction object is determined as the collision predicting point. In the step S83, the processor 30 stores (updates) the coordinate data of the collision predicting point as the collision prediction point data 304m in the data storage area 304.

In a next step S85, it is determined whether the collision predicting point is a point on the target object. In other words, it is determined, in the step S85, whether the collision predicting point is a point on another reaction object existing between the player character 102 and the target object. If "YES" is determined in the step S85, that is, if the collision predicting point is a point on the target object, the process proceeds to a step S91. Although illustration is omitted, the processor 30 eliminates the collision prediction object data 304n at this time.

On the other hand, if "NO" is determined in the step S85, that is, if the collision predicting point is a point on another reaction object existing between the player character 102 and the target object, in a step S87, the reaction object including the collision predicting point is determined as the collision prediction object. In the step S87, the processor 30 stores (updates) identification information of the collision prediction object as the collision prediction object data 304$n$ in the data storage area 304.

Subsequently, in a step S89, a display manner of the target cursor 120 and a display manner of the route object 122 are set (changed). In the step S89, it is set that the target cursor 120 is displayed in grayout, and that the spherical objects 122$a$ among the plurality of spherical objects 122$a$ constituting the route object 122, which being placed a side of the target point (target object) of the collision predicting point (collision prediction object) are displayed in grayout. Then, the mark object 126 is arranged at the collision predicting point in the step S91, and the emphasis object 130 is arranged to the target object or the collision prediction object in the step S93, and the process returns to the entire game processing.

In the step S93, when the collision prediction object data 304$n$ is stored, the emphasis object 130 for emphasizing the contour of this collision prediction object is arranged to the collision prediction object indicated by the identification information corresponding to this collision prediction object data 304$n$. In the step S93, when the collision prediction object data 304$n$ is not stored, to the target object indicated by the identification information corresponding to the target object data 304$i$, the emphasis object 130 for emphasizing the contour of this target object is arranged.

Moreover, as described above, if "YES" is determined in the step S51, in the step S95 shown in FIG. 16, a movement of the throwing object 110 is started, and in the step S97, the throwing object 110 is made to be moved on the route by the fifth predetermined distance. However, the route is a route for the throwing object 110 determined by the line segment that connects the starting point and the target point when the throw operation is performed.

In a subsequent step S99, the fourth collision determination processing is performed. In the fourth collision determination processing, it is determined whether the throwing object 110 collides with the target object or the collision prediction object. In a next step S101, it is determined whether the throwing object 110 collides with the target object or the collision prediction object in the fourth collision determination processing.

If "YES" is determined in the step S101, that is, if the throwing object 110 collides with the target object or the collision prediction object in the fourth collision determination processing, predetermined processing according to the collision object is performed in a step S103, and the process proceeds to a step S109. On the other hand, if "NO" is determined in the step S101, that is, if the throwing object 110 does not collide with the target object or the collision prediction object in the fourth collision determination processing, it is determined, in a step S105, whether the throwing object 110 is moved a maximum distance. For example, it is determined whether the throwing object 110 reaches the far clipping plane 254. If "NO" is determined in the step S105, that is, if the throwing object 110 does not move the maximum distance, the process returns to the entire game processing.

On the other hand, if "YES" is determined in the step S105, that is, if the throwing object 110 is moved the maximum distance, the throwing object 110 is erased in a step S107, and it is determined, in the step S109, whether the player character 102 possesses another throwing object 110. If "YES" is determined in the step S109, that is, if the player character 102 possesses another throwing object 110, the process returns to the entire game processing. On the other hand, if "NO" is determined in the step S109, that is, if the player character 102 does not possess another throwing object 110, the throw flag 304$q$ is turned off in a step S111, and then, the process returns to the game control processing.

According to this embodiment, the target cursor is made to be moved within a predetermined plane according an operation of the player, a position within the virtual game space designated by the target cursor is determined as the target point, and the route object is displayed on the line segment that connects the starting point that a movement of the throwing object is started to the target point, and therefore, it is possible to easily know the target object with which the throwing object collides.

Moreover, according to this embodiment, since the shadow of the spherical object that constitutes the route object is displayed, a movement route of the throwing object can be indicated intelligibly.

Furthermore, in this embodiment, since the player character is turned in the direction that the throwing object is to be moved, a movement direction of the throwing object can be indicated intelligibly.

Furthermore, according to this embodiment, since the emphasis object is displayed on the contour of the collision prediction object with which the throwing object is predicted to collide, it is possible to more intelligibly indicate the target object with which the throwing object is to be collided.

Moreover, according to this embodiment, since the mark object is displayed on the collision predicting point, it is possible to more intelligibly indicate the target object with which the throwing object is to be collided.

In addition, although this embodiment is described on the portable type game apparatus, the stationary type game apparatus or the game apparatus switchable between the portable type and the stationary type, a part or all of the game processing may be performed by a further game apparatus or computer that is communicably connected to the game apparatus. In such a case, a game system (image processing system) can be constituted by the game apparatus of this embodiment and the further game apparatus or computer that is communicably connected to the game apparatus.

Moreover, although the shadow is drawn with the Material in this embodiment on the terrain just below each spherical object included in the route object, a shadow generated by a light of the light source may be drawn by shading. Alternatively, in the step S71, the shadow object may be placed just below each spherical object and on the terrain.

Furthermore, in this embodiment, in the first collision determination processing, when the first determination object is moved from the target cursor, the reaction object with which the first determination object collides first is determined as the target object, but it does not need to be limited to this. For example, all the reaction objects with which the first determination object collides may be determined as target objects. Then, a single target object may be selected by the player from the plurality of target objects.

Furthermore, although when the throwing object that the player character throws collides with a single reaction object, the throwing object is eliminated and the predetermined processing that is set corresponding to the reaction object concerned is performed in this embodiment, even if the throwing object collides the reaction object, the throwing object may be moved to the target point.

Moreover, although this embodiment is described on a case where the player object throws the throwing object, an object to be thrown (fired) does not need to be limited. Depending on the type of the game, an object imitating the bullet may be shot (fired), an object imitating the soccer ball may be kicked, or an object imitating the arrow may be shot off. These objects are also an object that the player character can throw or shoot.

Furthermore, the content of game, the configuration of the game apparatus and specific numerical values shown in this embodiment are mere examples and should not be limited and can be appropriately changed according to actual products. For example, as for the operation means (analog stick, operating buttons) for instructing the movement of the player character, the movement of the target cursor, switching between the normal mode and the throw mode, an operating means different from the operating means shown in the embodiment may be used.

Although certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory computer readable storage medium storing a game program executable by a computer of an information processing apparatus, wherein the game program, when executed, causes one or more processors of the computer to at least:
   move a cursor object on a predetermined plane based on an operation of a player, and arrange the cursor object so as to be displayed on a front of another object in a virtual space;
   calculate a position in the virtual space corresponding to a display position of the cursor object, and render the calculated position as a designated position in the virtual space;
   place in the virtual space a route object that indicates a route from a predetermined starting point position to the designated position in the virtual space;
   arrange a player character in the virtual space so as to face the designated position, wherein the starting point position has a predetermined positional relationship with a position where the player character is arranged; and
   generate an image of the virtual space.

2. The storage medium according to claim 1, wherein generation of the image of the virtual space includes generating a shadow of the route object in the virtual space.

3. The storage medium according to claim 1, wherein the game program, when executed, further causes the one or more processors to at least place an object that indicates a shadow of the route object in the virtual space.

4. The storage medium according to claim 1, wherein the game program, when executed, further causes the one or more processors to at least switch between a cursor operating mode in which that the cursor object is to be moved and a player character moving mode in which the player character is to be moved based on an operation of the player.

5. The storage medium according to claim 1, wherein the game program, when executed, further causes the one or more processors to at least:
   discharge a predetermined discharge target object along the route from the starting point position toward the designated position based on an operation of the player; and
   when the discharge target object collides with a predetermined object in the virtual space after the discharge target object is discharged, perform predetermined processing according to the predetermined object.

6. The storage medium according to claim 5, wherein the game program, when executed, further causes the one or more processors to at least:
   determine, before the discharge target object is discharged, whether a targeted object to be processed in the predetermined processing is arranged at the designated position; and
   change a display manner of the targeted object, when it is determined that the targeted object is arranged at the designated position.

7. The storage medium according to claim 5, wherein the game program, when executed, further causes the one or more processors to at least:
   determine whether a further object exists on the route to the designated position; and
   change a display manner of the cursor object according to the determination as to whether the further object exists on the route to the designated position.

8. The storage medium according to claim 7, wherein the game program, when executed, further causes the one or more processors to at least change, when it is determined that the further object exists on the route to the designated position, a display manner of the route object from the starting point to the further object and a display manner of the route from the further object to the cursor object.

9. The storage medium according to claim 1, wherein the starting point exists within a visual volume defined by a near clipping plane and a far clipping plane and the cursor object is movable on the near clipping plane to control a direction of a discharge object dischargable from the starting point to object(s) designated by the cursor object, such that the discharge object is dischargable on a near side in comparison with the player character.

10. A game apparatus, comprising:
    at least one processor and a memory coupled thereto, the at least one processor being configured to control the game apparatus to at least:
    move a cursor object on a predetermined plane based on an operation of a player, and arrange the cursor object so as to be displayed in a front of another object in a virtual space;
    calculate a position in the virtual space corresponding to a display position of the cursor object, and render the calculated position as a designated position in the virtual space;
    arrange a player character in the virtual space so as to face the designated position;
    place in the virtual space a route object that indicates a route from a predetermined starting point position to the designated position in the virtual space, wherein the starting point position has a predetermined positional relationship with a position where the player character is arranged; and
    generate an image of the virtual space,
    wherein generation of the image of the virtual space includes generating a shadow of the route object in the virtual space.

11. A game system, comprising:
  at least one processor and a memory coupled thereto, the at least one processor being configured to control the game system to at least:
  move a cursor object on a predetermined plane based on an operation of a player, and arrange the cursor object so as to be displayed in a front of another object in a virtual space;
  calculate a position in the virtual space corresponding to a display position of the cursor object, and render the calculated position as a designated position in the virtual space;
  place in the virtual space a route object that indicates a route from a predetermined starting point position to the designated position in the virtual space;
  arrange a player character in the virtual space so as to face the designated position, wherein the starting point position has a predetermined positional relationship with a position where the player character is arranged; and
  generate an image of the virtual space.

12. The game system according to claim 11, wherein the generation of the image of the virtual space includes generating a shadow of the route object in the virtual space.

13. The game system according to claim 11, wherein the at least one processor is further configured to control the game system to at least place an object that indicates a shadow of the route object in the virtual space.

14. The game system according to claim 11, wherein the at least one processor is further configured to control the game system to at least switch between a cursor operating mode in which the cursor object is to be moved and a player character moving mode in which the player character is to be moved based on an operation of the player.

15. The game system according to claim 11, wherein the at least one processor is further configured to control the game system to at least:
  discharge a predetermined discharge target object along the route from the starting point position toward the designated position based on an operation of the player; and
  when the discharge target object collides with a predetermined object in the virtual space after the discharge target object is discharged, perform predetermined processing according to the predetermined object.

16. The game system according to claim 15, wherein the at least one processor is further configured to control the game system to at least:
  determine, before the discharge target object is discharged, whether a targeted object to be processed in the predetermined processing is arranged at the designated position; and
  change a display manner of the targeted object, when it is determined that the targeted object is arranged at the designated position.

17. The game system according to claim 15, wherein the at least one processor is further configured to control the game system to at least:
  determine whether a further object exists on the route to the designated position; and
  change a display manner of the cursor object according to the determination as to whether the further object exists on the route to the designated position.

18. The game system according to claim 17, wherein the at least one processor is further configured to control the game system to at least change, when it is determined that the further object exists on the route to the designated position, a display manner of the route object from the starting point to the further object and a display manner of the route from the further object to the cursor object.

19. The game system according to claim 11, wherein the starting point exists within a visual volume defined by a near clipping plane and a far clipping plane and the cursor object is movable on the near clipping plane to control a direction of a discharge object dischargable from the starting point to object(s) designated by the cursor object, such that the discharge object is dischargable on a near side in comparison with the player character.

20. A game control method performed by a computer of an information processing apparatus, the method comprising:
  (a) moving a cursor object on a predetermined plane based on an operation of a player so that the cursor object is arranged so as to be displayed in a front of another object in a virtual space;
  (b) calculating a position in the virtual space corresponding to a display position of the cursor object so as to render the calculated position as a designated position in the virtual space;
  (c) placing in the virtual space a route object that indicates a route from a predetermined starting point position to the designated position in the virtual space;
  (d) arranging a player character in the virtual space so as to face the designated position, wherein the starting point position has a predetermined positional relationship with a position where the player character is arranged; and
  (e) generating an image of the virtual space.

21. The method according to claim 20, further comprising placing an object that indicates a shadow of the route object in the virtual space.

22. The method according to claim 20, wherein the starting point exists within a visual volume defined by a near clipping plane and a far clipping plane and the cursor object is movable on the near clipping plane to control a direction of a discharge object dischargable from the starting point to object(s) designated by the cursor object, such that the discharge object is dischargable on a near side in comparison with the player character.

* * * * *